US012219429B2

(12) United States Patent
Volkerink et al.

(10) Patent No.: US 12,219,429 B2
(45) Date of Patent: Feb. 4, 2025

(54) USING WIRELESS NETWORKS FOR LOCATIONING AND DATA TRANSFER

(71) Applicant: TRACKONOMY SYSTEMS, INC., San Jose, CA (US)

(72) Inventors: Hendrik J. Volkerink, Palo Alto, CA (US); Ajay Khoche, West San Jose, CA (US); Carl M. Skonberg, Long Beach, NY (US)

(*) Notice: Subject to any disclaimer, the term of this patent is extended or adjusted under 35 U.S.C. 154(b) by 203 days.

(21) Appl. No.: 17/558,234

(22) Filed: Dec. 21, 2021

(65) Prior Publication Data
US 2022/0201435 A1  Jun. 23, 2022

Related U.S. Application Data

(60) Provisional application No. 63/235,916, filed on Aug. 23, 2021, provisional application No. 63/128,777, filed on Dec. 21, 2020.

(51) Int. Cl.
| | | |
|---|---|---|
| *H04W 4/02* | (2018.01) | |
| *G01S 5/02* | (2010.01) | |
| *H04W 4/029* | (2018.01) | |
| *H04W 4/38* | (2018.01) | |
| *H04W 48/08* | (2009.01) | |
| *H04W 48/16* | (2009.01) | |

(52) U.S. Cl.
CPC ......... *H04W 4/029* (2018.02); *G01S 5/02525* (2020.05); *H04W 4/025* (2013.01); *H04W 4/38* (2018.02); *H04W 48/08* (2013.01); *H04W 48/16* (2013.01)

(58) Field of Classification Search
CPC ....... H04W 4/029; H04W 4/025; H04W 4/38; H04W 48/08; H04W 48/16; H04W 48/10; G01S 5/02525; G01S 5/0252; G01S 5/14
See application file for complete search history.

(56) References Cited

U.S. PATENT DOCUMENTS

| | | |
|---|---|---|
| 11,115,732 B2 | 9/2021 | Lucrecio |
| 2011/0086609 A1 | 4/2011 | Buehler et al. |

(Continued)

FOREIGN PATENT DOCUMENTS

| | | |
|---|---|---|
| AU | 2018204317 A1 | 1/2019 |
| AU | 2018250358 A1 | 5/2019 |

(Continued)

OTHER PUBLICATIONS

International Patent Application No. PCTUS22/25110 International Search Report and Written Opinion dated Aug. 16, 2022, 12 pages.

(Continued)

*Primary Examiner* — Nader Bolourchi

(57) ABSTRACT

In some implementations, a locating agent may identify, at the locating agent, one or more identifiable access points, each identifiable access point establishing a wireless network and being identifiable to the locating agent via a signal broadcast from the identifiable access point. The locating agent may compare the identified one or more identifiable access points to an access-point database defining known access points to the wireless tracking system. The locating agent may connect to one of the identifiable access points based on the comparing. The locating agent may transmit one or more of sensed and monitoring data captured at the locating agent to an external device via the connected access point.

24 Claims, 23 Drawing Sheets

(56) References Cited

U.S. PATENT DOCUMENTS

| | | |
|---|---|---|
| 2012/0302284 A1 | 11/2012 | Rishy-Maharaj et al. |
| 2014/0141795 A1 | 5/2014 | Abraham et al. |
| 2016/0260059 A1 | 9/2016 | Benjamin et al. |
| 2017/0041949 A1 | 2/2017 | Ngo et al. |
| 2017/0164318 A1 | 6/2017 | Smith |
| 2018/0165568 A1 | 6/2018 | Khoche |
| 2018/0341911 A1 | 11/2018 | Daoura et al. |
| 2018/0349845 A1 | 12/2018 | Klein |
| 2019/0037362 A1 | 1/2019 | Nogueira-Nine |
| 2019/0037418 A1 | 1/2019 | Gunasekara et al. |
| 2019/0113632 A1 | 4/2019 | Lucrecio et al. |
| 2019/0235092 A1 | 8/2019 | Bastian et al. |
| 2019/0272458 A1 | 9/2019 | Khoche |
| 2019/0380007 A1 | 12/2019 | Mahmoud et al. |
| 2020/0128482 A1 | 4/2020 | Daoura et al. |

FOREIGN PATENT DOCUMENTS

| | | |
|---|---|---|
| CA | 3061878 A1 | 4/2018 |
| CA | 3008512 A1 | 6/2018 |

OTHER PUBLICATIONS

International Patent Application No. PCTUS2021/064687 International Search Report and Written Opinion dated Apr. 21, 2022, 12 pages.

International Patent Application No. PCTUS2022/015125 International Search Report and Written Opinion dated May 4, 2022, 15 pages.

DATABASE 1600

CALIFORNIA WI-FI NETWORKS

| NETWORK ID | PASSWORD | PRIORITY | COORDINATES | SUCCESS | CATEGORY |
|---|---|---|---|---|---|
| STORAGEWIFI01 | P@55W0RD01 | 1 | (37.5, -122.2) | 100 | PRIVATE |
| RETAILWIFIABC | !BUYSUPPLIES! | 2 | (37.4, -122.4) | 95 | PUBLIC |
| COFFEESHOPWIFI | ESPRESSO123 | 3 | (37.4, -122.4) | 95 | PUBLIC |
| ... | | | | | |

COLORADO WI-FI NETWORKS

| | | | | | |
|---|---|---|---|---|---|
| WELCOME2COWIFI | TOURGU1DE | 2 | (39.2, -108.9) | 100 | PUBLIC |
| ... | | | | | |

*FIG. 16*

USING WIRELESS NETWORKS FOR LOCATIONING AND DATA TRANSFER

RELATED APPLICATIONS

This application claims priority to U.S. Patent Application No. 63/128,777, titled "Using Wireless Networks for Locationing and Data Transfer," filed Dec. 21, 2020, and to U.S. Patent Application No. 63/235,916, filed Aug. 23, 2021, both of which are incorporated herein by reference in their entirety.

FIELD OF THE DISCLOSURE

This disclosure generally relates to Industrial Internet of Things (IOT) and more particularly to asset management, including tracking, warehousing, inventorying, and monitoring items (e.g., objects, tools, and other equipment).

BACKGROUND

Tracking devices may be used to track people and objects (collectively referred to herein as "assets") in real time and communicate the collected tracking data (e.g., location data) to a server or client device. In a conventional Internet of Things (IOT) system, tracking devices deployed at different nodes may communicate to a central system that provides tracking data to users. In some cases, the tracking devices continuously communicate the full range of tracking data collected to the central system at all times. However, this "always-on" communication results in high power consumption, particularly when the tracking devices are using wireless communication to send data to the central system. Situations may arise where the tracked person or object does not require the full functionality of the tracking device or only requires a limited set of functionalities.

SUMMARY

In a first aspect, a method for identifying an access point for connection by a locating agent of a wireless tracking system includes: identifying, at the locating agent, one or more identifiable access points, each identifiable access point establishing a wireless network and being identifiable to the locating agent via a signal broadcast from the identifiable access point; comparing the identified one or more identifiable access points to an access-point database defining known access points to the wireless tracking system; connecting to one of the identifiable access points based on the comparing; and transmitting one or more of sensed and monitoring data captured at the locating agent to an external device via the connected access point.

In embodiments of the first aspect, the identifying including identifying a respective SSID of each identifiable access point broadcast by each identifiable access points.

In any above embodiment of the first aspect, the identifying including identifying a received signal strength corresponding to each access point.

In any above embodiment of the first aspect, the comparing including identifying a connection access point list prioritizing each of the identifiable access points for selection as the connection access point by the locating agent.

In any above embodiment of the first aspect, the access-point database including an authorized access points list, a verified access points list, and an unusable access points list; the identifying a connection access point list including prioritizing each of the identifiable access points based on at least one of the authorized access points list, the verified access points list, and the unusable access points list.

In any above embodiment of the first aspect, the identifying a connection access point list including prioritizing each of the identifiable access points based on prior connection success to each identifiable access point least by other locating agents.

In any above embodiment of the first aspect, the method includes comprising determining location of the locating agent based on the identifiable access points; and, receiving an update to the access-point database when the location indicates the locating agent has crossed a pre-defined geofence.

In any above embodiment of the first aspect, the method includes storing connection history of the locating agent to at least one of the identifiable access points; and transmitting the connection history to another device.

In any above embodiment of the first aspect, the method includes identifying one or more of the identifiable access points as an unknown access point without known connection information within the access-point database; guessing connection information for the unknown access point; and transmitting the guessed connection information to another device when the connection information works to connect the locating agent to the unknown access point.

In any above embodiment of the first aspect, the method includes communicating over cellular network when connection to the connection access point is unavailable; when communicating over the cellular network, implementing a connection governor; and when the connection access point is a Wi-Fi access point and communicating via the connection access point, reducing the connection governor.

In any above embodiment of the first aspect, the method is implemented by a locating agent or calibration node including a processor and computer readable instructions that when executed by the processor implement the method.

In a second aspect, a method for determining location of a locating agent of a wireless tracking system includes: identifying, at the locating agent, one or more identifiable access points, each identifiable access point establishing a wireless network; and comparing an access point characteristic of each of the one or more identifiable access points to known access point information to determine the location of the locating agent, wherein the known access point information is populated based on a planned itinerary for the locating agent.

In an embodiment of the second aspect, the method includes, when the location indicates the locating agent has passed a geofence, transmitting an alert to an external device In any above embodiment of the second aspect, the method includes, after transmitting an alert to the external device, receiving an update to the known access point information, the update including additional known access points based on the geofence passed.

In any above embodiment of the second aspect, the method includes comparing the identifiable access points to a known access point list corresponding to the planned itinerary; and when the identifiable access points do not correspond to the known access point list, transmitting an off-course alert.

In any above embodiment of the second aspect, the identifiable access points do not correspond to the known access point list when no known access points in the known access point list match the identifiable access points.

In any above embodiment of the second aspect, the identifiable access points do not correspond to the known access point list when less than a threshold number of known access points in the known access point list match the identifiable access points.

In any above embodiment of the second aspect, transmitting an off-track alert includes activating a cellular communication device to transmit the off-course alert.

In any above embodiment of the second aspect, the comparing an access point characteristic of each of the one or more identifiable access points to known access point information to determine the location of the locating agent occurs without connecting to a network established by at least one of the one or more identifiable access points.

In any above embodiment of the second aspect, the method is implemented by a locating agent or calibration node including a processor and computer readable instructions that when executed by the processor implement the method.

In a third aspect, a method for configuring a mesh network within a building includes: identifying existing access points identifiable by a locating agent within the building, the existing access points operating according to a first communication protocol; generating a no-connection list indicating when the locating agent cannot access the identifiable access points; comparing a location of the locating agent to the no-connection list to identify a network void spot within the building; and after the comparing, updating an access point list with information regarding an infrastructure node corresponding to the network void spot, the infrastructure node having a second communication protocol different than the first communication protocol.

In an embodiment of the third aspect, the adding including updating the added infrastructure node in a known access point list.

In any above embodiment of the third aspect, the method including utilizing the added infrastructure node to locate the locating agent.

In any above embodiment of the third aspect, the existing access points operate according to a first service, and the infrastructure node operates according to a second service different from the first service.

In any above embodiment of the third aspect, the second service being a dedicated network requiring registration thereto.

In any above embodiment of the third aspect, the method is implemented by a locating agent or calibration node including a processor and computer readable instructions that when executed by the processor implement the method.

In a fourth aspect, a method for controlling connection of a wireless tracking device to an access point includes: receiving, at a server and from a wireless agent of a plurality of wireless agents, connection history defining attempts to connect to one or more access points; generating, based at least in part on the connection history, a global access point database; and transmitting at least a portion of the global access point database to one of the plurality of wireless agents for use thereby in communicating via the one or more access points.

In an embodiment of the fourth aspect, the method includes identifying one or more of the identifiable access points as an unknown access point without known connection information within an access-point database stored in local memory of the wireless agent; guessing connection information for the unknown access point; and storing the guessed connection information as at least a portion of the connection history when the connection information successfully enables the wireless agent to connect to the unknown access point.

In any embodiment of the fourth aspect, the method includes instructing to place or install the wireless agent on an asset that includes one or more wireless tracking agents used to track the asset.

In any embodiment of the fourth aspect, the method includes monitoring location of a locating agent of the plurality of wireless agents; determining that the locating agent has crossed a geofence; and transmitting a portion of the global access point database corresponding to an area associated with a location of the locating agent when the another locating agent crossed the geofence.

In any embodiment of the fourth aspect, the step of transmitting including transmitting the at least a portion of the global access point database to the wireless agent.

In any above embodiment of the fourth aspect, the method is implemented by a locating agent or calibration node including a processor and computer readable instructions that when executed by the processor implement the method.

BRIEF DESCRIPTION OF THE DRAWINGS

FIG. 16 shows an embodiment of an access-point database, which is an example of access-point database of FIG. 15, in embodiments.

DETAILED DESCRIPTION

Figure 1:
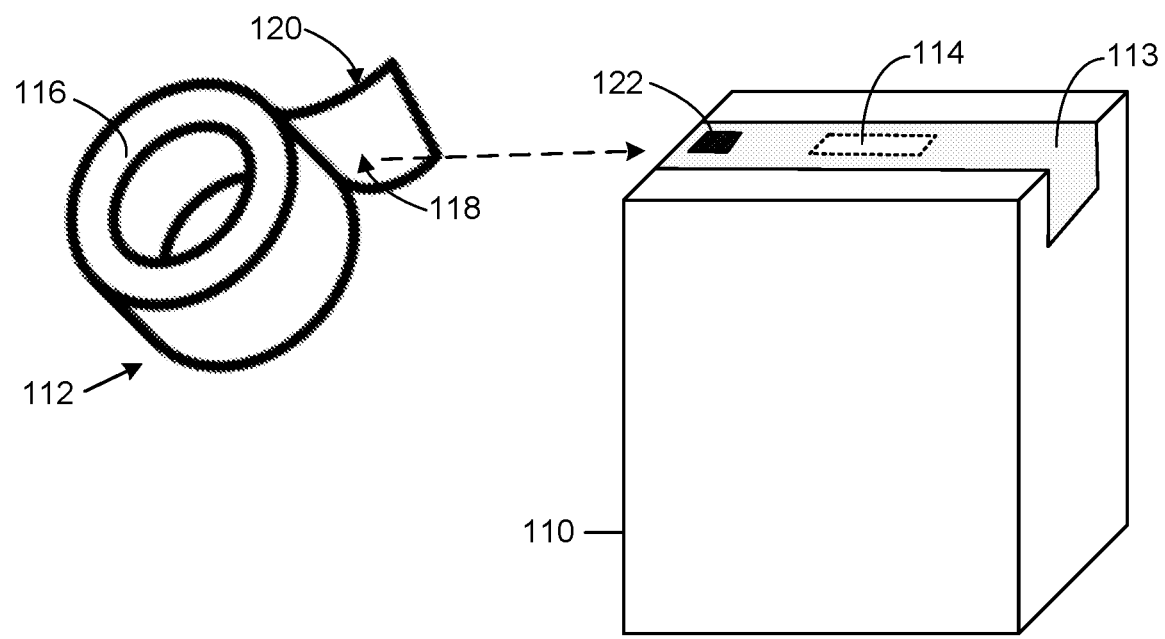
FIG. 1 shows an example adhesive tape-agent platform, including wireless transducing circuit, used to seal a package for shipment.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

In some contexts, the tem "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

Further, each of the "agents", "nodes", "tape nodes", and "tape agents" may include flexible or non-flexible form factors unless otherwise specified. Thus, each of the "agents", "nodes", "tape nodes", and "tape agents" include flexible and non-flexible (rigid) form factors, or a combination thereof including flexible components and non-flexible components.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

Adhesive Tape Platform

FIG. 1 shows an example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
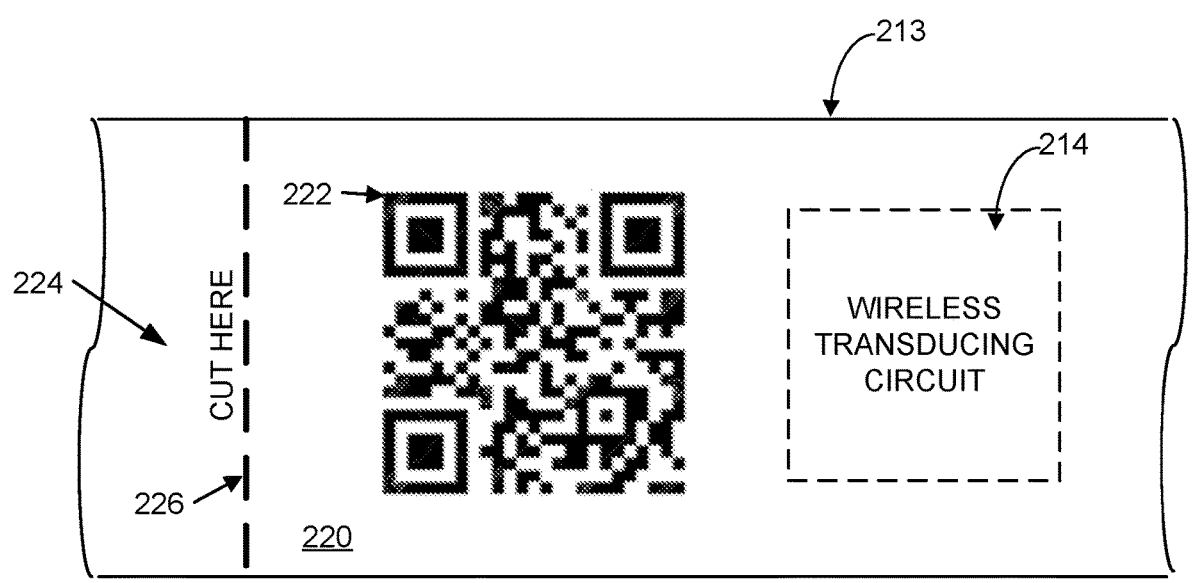
FIG. 2 shows the non-adhesive surface of the segment of the adhesive tape agent platform of FIG. 1 including writing or other markings, in an embodiment.

FIG. 2 shows the non-adhesive surface 220 of the segment 213 of the adhesive tape-agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 213 of the adhesive tape agent platform 212 includes an identifier 222 (e.g., a two-dimensional bar code, such as a QR Code), written instructions 224 (e.g., "Cut Here"), and an associated cut line 226 that indicates where the user should cut the adhesive tape agent platform 212. The written instructions 224 and the cut line 226 typically are printed or otherwise marked on the top non-adhesive surface 220 of the adhesive tape agent platform 212 during manufacture. The identifier 222 (e.g., a two-dimensional bar code), on the other hand, may be marked on the non-adhesive surface 220 of the adhesive tape agent platform 212 during the manufacture of the adhesive tape agent platform 212 or, alternatively, may be marked on the non-adhesive surface 220 of the adhesive tape agent platform 212 as needed using, for example, a printer or other marking device.

To avoid damaging the functionality of the segments of the adhesive tape agent platform 212, the cut lines 226 may demarcate the boundaries between adjacent segments at locations that are free of any active components of the wireless transducing circuit 214. The spacing between the wireless transducing circuit 214 and the cut lines 226 may vary depending on the intended communication, transducing and/or adhesive taping application. In the example illustrated in FIG. 2, the length of the adhesive tape-agent platform 212 that is dispensed to seal the package 210 corresponds to a single segment of the adhesive tape-agent platform 212. In other examples, the length of the adhesive tape-agent platform 212 needed to seal a package or otherwise serve the adhesive function for which the adhesive tape-agent platform 212 is being applied may include multiple segments 213 of the adhesive tape-agent platform 212, one or more of which segments 213 may be activated upon cutting the length of the adhesive tape-agent platform 212 from the roll 216 and/or applying the segment 213 of the adhesive tape agent platform to the package 210.

In some examples, the wireless transducing circuits 214 embedded in one or more segments 213 of the adhesive tape-agent platform 212 are activated when the adhesive tape agent platform 212 is cut along the cut line 226. In these examples, the adhesive tape-agent platform 212 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 214 in one or more segments of the adhesive tape-agent platform 212 in response to being separated from the adhesive tape-agent platform 212 (e.g., along the cut line 226).

In some examples, each segment 213 of the adhesive tape agent platform 212 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 212. In other examples, when a given length of the adhesive tape agent platform 212 includes multiple segments 213, the energy sources in the respective segments 213 are configured to supply power to the wireless transducing circuit 214 in all of the segments 213 in the given length of the adhesive tape agent platform 212. In some of these examples, the energy sources are connected in parallel and concurrently activated to power the wireless transducing circuit 214 in all of the segments 213 at the same time. In other examples, the energy sources are connected in parallel and alternately activated to power the wireless transducing circuit 214 in respective ones of the segments 213 at different time periods, which may or may not overlap.

Figure 3:
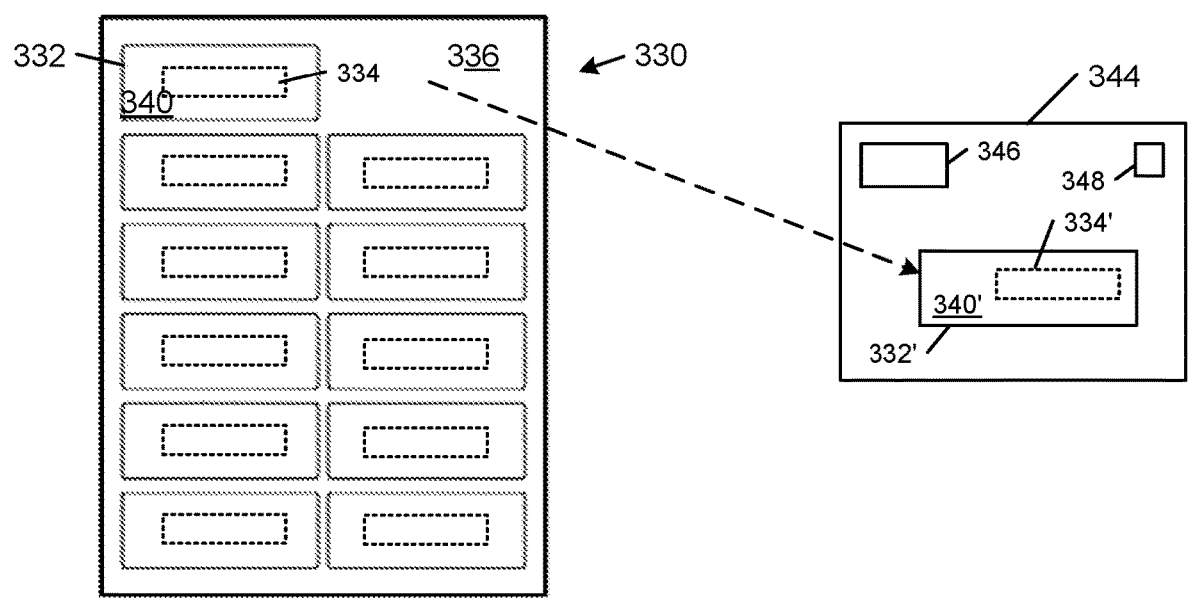
FIG. 3 shows an example adhesive tape platform that includes a set of adhesive tape platform segments, in an embodiment.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
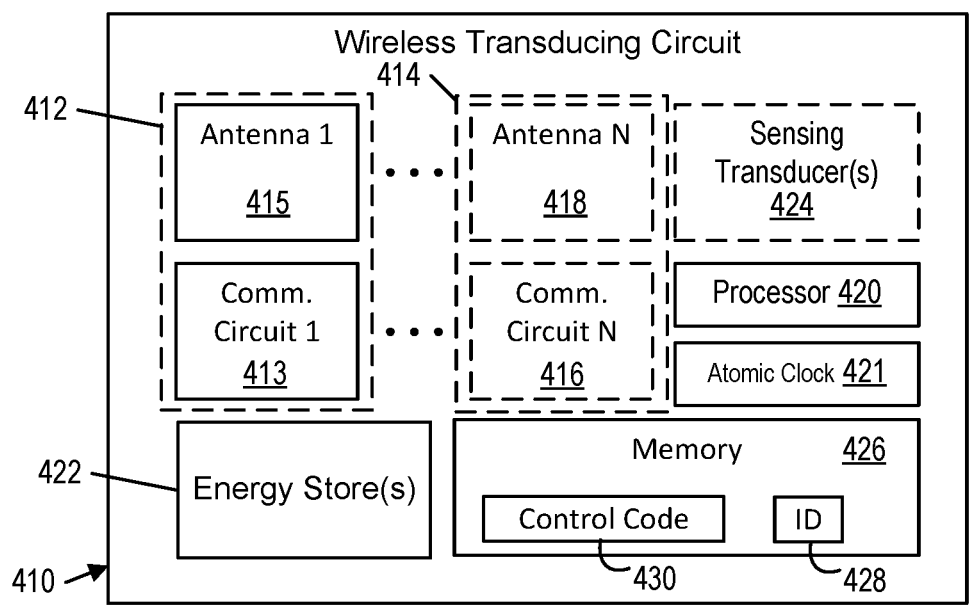
FIG. 4 shows a block diagram of the components of an example wireless transducing circuit, in an embodiment.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
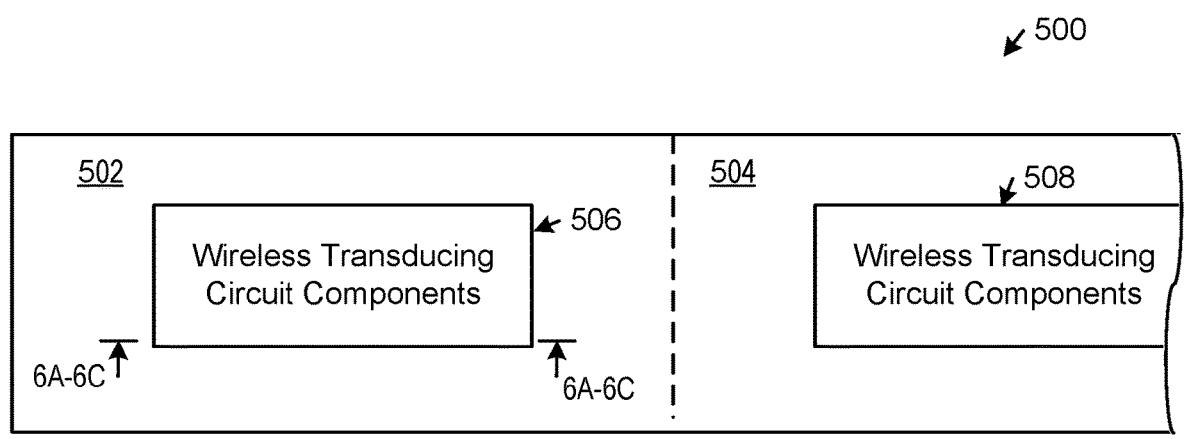
FIG. 5 is a top view of a portion of an example flexible adhesive tape platform, in an embodiment.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 500 according to a roll-to-roll fabrication process is described in connection with FIGS. 6A-6C and as shown in FIGS. 7A and 7C of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 6A:
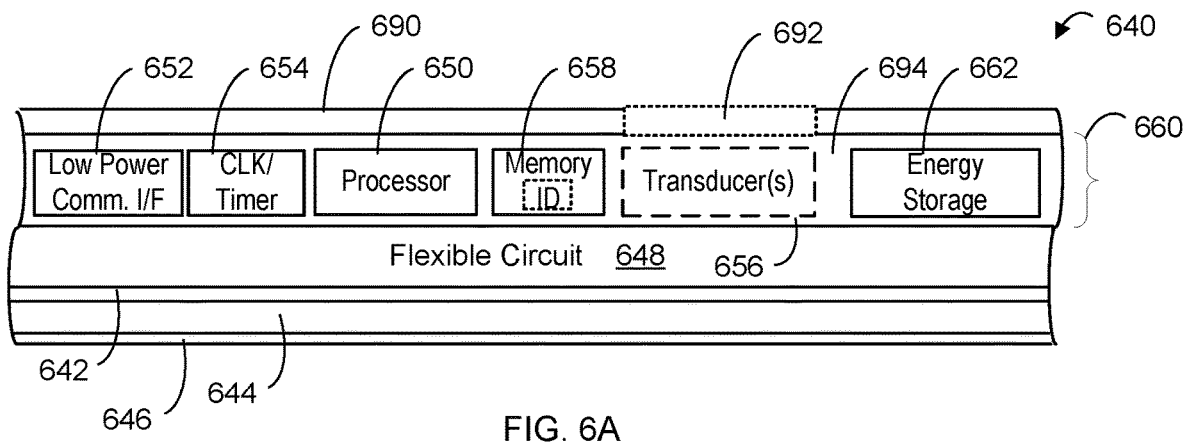
FIG. 6A shows a cross-sectional side-view of a portion of an example segment of a flexible adhesive tape agent platform that includes a respective set of the components of the wireless transducing circuit corresponding to a first tape-agent type.

FIG. 6A shows a cross-sectional side view of a portion of an example segment 640 of a flexible adhesive tape agent platform (e.g., platform 332 of FIG. 3) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

Figure 6B:
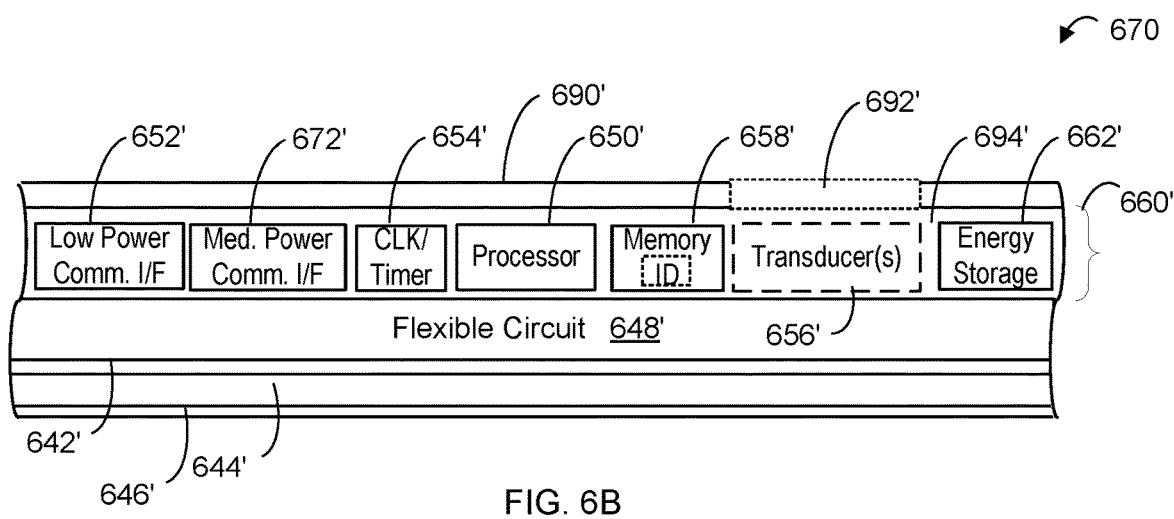
FIG. 6B shows a cross-sectional side-view of a portion of an example segment of a flexible adhesive tape agent platform that includes a respective set of the components of the wireless transducing circuit corresponding to a second tape-agent type.

FIG. 6B shows a cross-sectional side-view of a portion of an example segment 670 of a flexible adhesive tape agent platform (e.g., platform 332 of FIG. 3) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

Figure 6C:
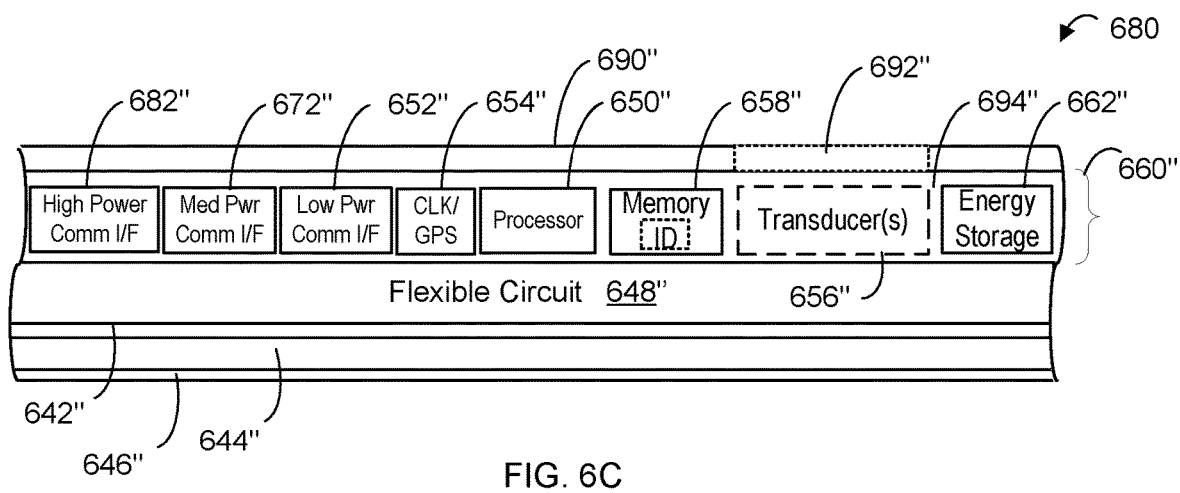
FIG. 6C shows a cross-sectional side view of a portion of an example segment of the flexible adhesive tape-agent platform that includes a respective set of the components of the wireless transducing circuit corresponding to the third tape-node type.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power wireless communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662,

662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Figure 7:
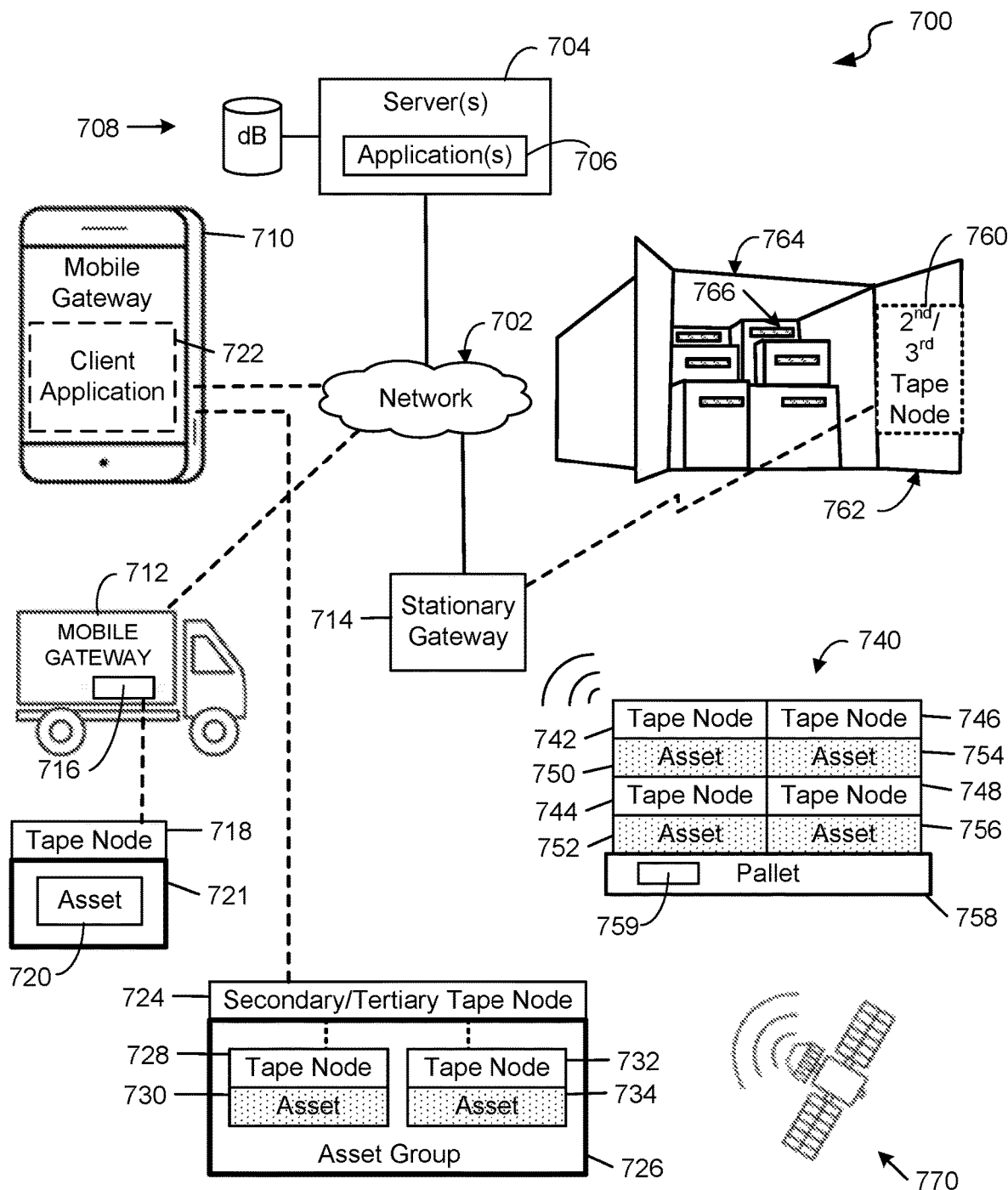
FIG. 7 shows an example network communications environment, in an embodiment.

FIG. 7 shows an example network communications environment 700 that includes a network 702 that supports communications between one or more servers 704 executing one or more applications of a network service 708, mobile gateways 710 (a smart device mobile gateway), 712 (a vehicle mobile gateway), a stationary gateway 714, and various types of tape nodes that are associated with various assets (e.g., parcels, equipment, tools, persons, and other things). Hereinafter "tape nodes" may be used interchangeably with the "agents", as described herein; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 702 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 702 includes communications infrastructure equipment, such as a geolocation satellite system 770 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and Zig-Bee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 720) or other stationary (e.g., stationary gateway 714) or mobile object (e.g., a, such as a delivery truck, such as mobile gateway 712) or stationary object (e.g., a structural element of a building). This process activates the tape node (e.g., the tape node 718) and causes the tape node 718 to communicate with the one or more servers 704 of the network service 708. In this process, the tape node 718 may communicate through one or more other tape nodes (e.g., the tape nodes 742, 744, 746, 748) in the communication hierarchy. In this process, the one or more servers 704 executes the network service application 706 to programmatically configure tape nodes 718, 724, 728, 732, 742, 744, 746, 748, that are deployed in the network communications environment 700. In some examples, there are multiple classes or types of tape nodes (e.g., a master agent, secondary agent, or tertiary agent), where each tape node class has a different respective set of functionalities and/or capacities, as described above with respect to the "agents" in FIGS. 1-6. For example, the master agents have a lower-power wireless communication interface (e.g., the low-power wireless-communication interface 652, with reference to FIG. 6), in comparison to the secondary and tertiary agents).

In some examples, the one or more servers 704 communicate over the network 702 with one or more gateways 710, 712, 714 that are configured to send, transmit, forward, or relay messages to the network 702 in response to transmissions from the tape nodes 718, 724, 728, 732, 742, 744, 746, 748 that are associated with respective assets and within communication range. Example gateways include mobile gateways 710, 712 and a stationary gateway 714. In some examples, the mobile gateways 710, 712, and the stationary gateway 714 are able to communicate with the network 702 and with designated sets or groups of tape nodes.

In some examples, the mobile gateway 712 is a vehicle (e.g., a delivery truck or other mobile hub) that includes a wireless communications unit 716 that is configured by the network service 708 to communicate with a designated network of tape nodes, including tape node 718 (e.g., a master tape node) in the form of a label that is adhered to a parcel 721 (e.g., an envelope) that contains an asset 720, and is further configured to communicate with the network service 708 over the network 702. In some examples, the tape node 718 includes a lower-power wireless-communications interface of the type used in, e.g., segment 640 (shown in FIG. 6A), and the wireless communications unit 716 may implemented by a secondary or tertiary tape node (e.g., one of segment 670 or segment 680, respectively shown in FIGS. 6B and 6C) that includes a lower-power communications interfaces for communicating with tape nodes within range of the mobile gateway 712 and a higher-power communications-interface for communicating with the network 702. In this way, the tape node 718 and wireless communications unit 716 create a hierarchical wireless network of tape nodes for transmitting, forwarding, bridging, relaying, or otherwise communicating wireless messages to, between, or on behalf of the tape node 718 in a power-efficient and cost-effective way.

In some examples, a mobile gateway 710 is a mobile phone that is operated by a human operator and executes a client application 722 that is configured by a network service to communicate with a designated set of tape nodes, including a secondary or tertiary tape node 724 that is adhered to a parcel 726 (e.g., a box), and is further configured to communicate with a server 704 over the network 702. In the illustrated example, the parcel 726 contains a first parcel labeled or sealed by a master tape node 728 and containing a first asset 730, and a second parcel labeled or sealed by a master tape node 732 and containing a second asset 734. The secondary or tertiary tape node 724 communicates with each of the master tape nodes 728, 732 and also communicates with the mobile gateway 710. In some examples, each of the master tape nodes 728, 732 includes a lower-power wireless-communications interface of the type used in, e.g., segment 640 (shown in FIG. 6A), and the secondary/tertiary tape node 724 is implemented by a tape node (e.g., segment 670 or segment 680, shown in FIGS. 6B and 6C) that includes a low-power communications interface for communicating with the master tape nodes 728, 732 contained within the parcel 726, and a higher-power communications interface for communicating with the mobile gateway 710. The secondary or tertiary tape node 724 is operable to relay wireless communications between the master tape nodes 728, 732 contained within the parcel 726 and the mobile gateway 710, and the mobile gateway 710 is operable to relay wireless communications between the secondary or tertiary tape node 724 and the server 704 over the network 702. In this way, the master tape nodes 728 and 732 and the secondary or tertiary tape node 724 create a wireless network of nodes for transmitting, forwarding, relaying, or otherwise communicating wireless messages to, between, or on behalf of the master tape nodes 728, 732, the secondary or tertiary tape node 724, and the network service (not shown) in a power-efficient and cost-effective way.

In some embodiments, the client application 722 is installed on a mobile device (e.g., smartphone) that may also operate as mobile gateway 710. The client application 722 may cause the mobile device to function as a mobile gateway 710. For example, the client application 722 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 722) relays that data to the server 704 via cellular (2G, 3G, 4G, 5G) or Wi-Fi. Further, the client application 722 may cause the mobile device to establish a connection with, and receive pings (e.g., alerts to nearby assets that an environmental profile threshold has been exceeded), from the tape nodes or from the server 704. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 722 may share location data with the tape node, allowing the tape node to pinpoint its location.

In some examples, the stationary gateway 714 is implemented by a server 704 executing a network service application 706 that is configured by the network service 708 to communicate with a designated set 740 of master tape nodes 742, 744, 746, 748 that are adhered to respective parcels containing respective assets 750, 752, 754, 756 on a pallet 758. In other examples, the stationary gateway 714 is implemented by a secondary or tertiary tape node 760 (e.g., segments 670 or 680, respectively shown in FIGS. 6B and 6C) that is adhered to, for example, a wall, column or other infrastructure component of the physical premise's environment 700, and includes a low-power communications interface for communicating with nodes within range of the stationary gateway 714 and a higher-power communications interface for communicating with the network 702.

In one embodiment, each of the master tape nodes 742-748 is a master tape node and is configured by the network service 708 to communicate individually with the stationary gateway 714, which relays communications from the master tape nodes 742-748 to the network service 708 through the stationary gateway 714 and over the network 702. In another embodiment, one of the master tape nodes 742-748 at a time is configured to transmit, forward, relay, or otherwise communicate wireless messages to, between, or on behalf of the other master nodes on the pallet 758. In this embodiment, the master tape node may be determined by the master tape nodes 742-748 or designated by the network service 708. In some examples, the master tape nodes 742-748 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 759 is adhered to the pallet 758 and is configured to perform the role of a master node for the other master tape nodes 742-748. In these ways, the master tape nodes 742-748, 759 are configurable to create different wireless networks of nodes for transmitting, forwarding, relaying, bridging, or otherwise communicating wireless messages with the network service 408 through the stationary gateway 714 and over the network 702 in a power-efficient and cost-effective way.

In the illustrated example, the stationary gateway 714 also is configured by the network service 708 to communicate with a designated network of tape nodes, including the secondary or tertiary tape node 760 that is adhered to the inside of a door 762 of a shipping container 764, and is further configured to communicate with the network service 708 over the network 702. In the illustrated example, the shipping container 764 contains a number of parcels labeled or sealed by respective master tape nodes 766 and containing respective assets. The secondary or tertiary tape node 760 communicates with each of the master tape nodes 766 within the shipping container 764 and communicates with the stationary gateway 714. In some examples, each of the master tape nodes 766 includes a low-power wireless communications-interface (e.g., the low-power wireless-communication interface 652, with reference to FIG. 6A), and the secondary or tertiary tape node 760 includes a low-power wireless-communications interface (low-power wireless-communication interfaces 652', 652", with reference to FIGS. 6B-6C) for communicating with the master tape nodes 766 contained within the shipping container 764, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 714. In some examples, either a secondary or tertiary tape node, or both, may be used, depending on whether a high-power wireless-communication interface is necessary for sufficient communication.

In some examples, when the doors of the shipping container 764 are closed, the secondary or tertiary tape node 760 is operable to communicate wirelessly with the master tape nodes 766 contained within the shipping container 764. In some embodiments, both a secondary and a tertiary node are attached to the shipping container 764. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 760 is configured to collect sensor data from master tape nodes 766 and, in some embodiments, process the collected data to generate, for example, statistics from the collected data. When the doors of the shipping container 764 are open, the secondary or tertiary tape node 760 is programmed to detect the door opening (e.g., using a photodetector or an accelerometer component of the secondary or tertiary tape node 760) and, in addition to reporting the door opening event to the network service 708, the secondary or tertiary tape node 760 is further programmed to transmit the collected data and/or the processed data in one or more wireless messages to the stationary gateway 714. The stationary gateway 714, in turn, is operable to transmit the wireless messages received from the secondary or tertiary tape node 760 to the network service 708 over the network 702. Alternatively, in some examples, the stationary gateway 714 also is operable to perform operations on the data received from the secondary or tertiary tape node 760 with the same type of data produced by the secondary or tertiary tape node 760 based on sensor data collected from the master tape nodes 742-748. In this way, the secondary or tertiary tape node 760 and master tape node 766 create a wireless network of nodes for transmitting, forwarding, relaying, or otherwise communicating wireless messages to, between, or on behalf of the master tape node 766, the secondary or tertiary tape nodes 760, and the network service 708 in a power-efficient and cost-effective way.

In an example of the embodiment shown in FIG. 7, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent"). The short-range master tape nodes typically are adhered directly to parcels containing assets. In the illustrated example, the master tape nodes 718, 728, 732, 742-748, 766 are short-range tape nodes. The short-range tape nodes typically communicate with a low-power wireless-communication protocol (e.g., Bluetooth LE, Zigbee, or Z-wave). The segment 670 are typically adhered to objects (e.g., a parcel 726 and a shipping container 764) that are associated with multiple parcels that are separated from the medium-range tape nodes by a barrier or a long distance. In the illustrated example, the secondary and/or tertiary tape nodes 724 and 760 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 700.

In the illustrated example, the mobile gateway 712 and the stationary gateway 714 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 712 (e.g., a truck). In these examples, the wireless communications unit 716 may be moved to different locations in the network communications environment 700 to assist in connecting other tape nodes to the wireless communications unit 716. In some examples, the stationary gateway 714 is a tape node that may be attached to a stationary structure (e.g., a wall) in the network communications environment 700 with a known geographic location (e.g., GPS coordinates). In these examples, other tape nodes in the environment may determine their geographic location by querying the stationary gateway 714.

In some examples, in order to conserve power, the tape nodes typically communicate according to a schedule promulgated by the network service 708. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 704, either directly or indirectly through a gateway tape node (e.g., the long-range tape node, such as wireless communication unit 716, adhered to the mobile gateway 712, or a long-range tape node, such as stationary gateway 714, that is adhered to an infrastructure component of the network communications environment 700). In other examples, the master tape node processes the information contained in the received data packets and transmits the processed information to the server 704.

Hierarchical Wireless Communications Network

Figure 8:
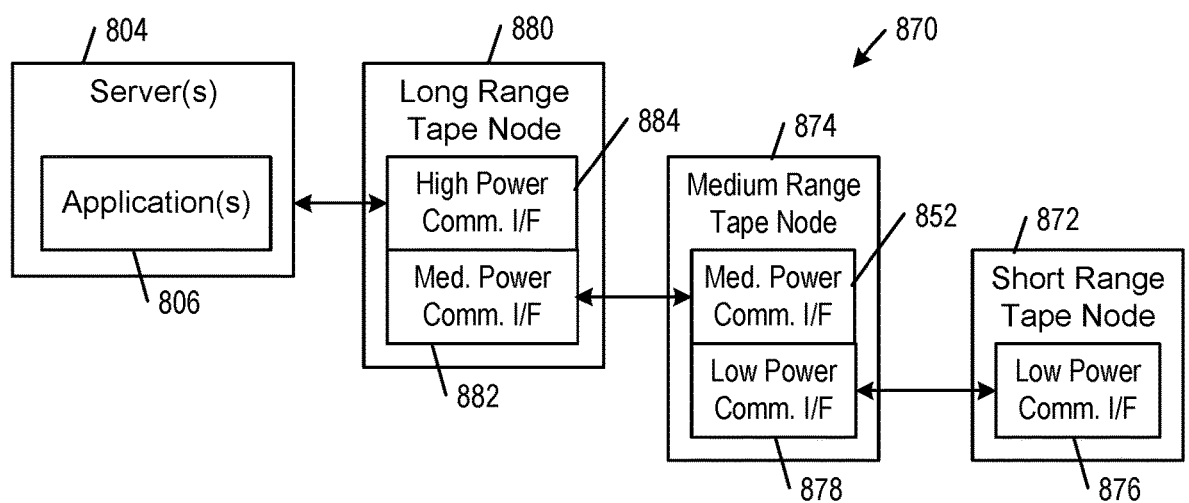
FIG. 8 shows an example hierarchical wireless communications network of tape nodes, in an embodiment.

FIG. 8 shows an example hierarchical wireless communications network of tape nodes 870. In this example, the short-range tape node 872 and the medium range tape node 874 communicate with one another over their respective low power wireless communication interfaces 876, 878. The medium range tape node 874 and the long-range tape node 880 communicate with one another over their respective medium power wireless communication interfaces 878, 882. The long-range tape node 880 and the one or more network service servers 804 (which may be an example of server 704 of FIG. 7) communicate with one another over the high-power communication interface 884. In some examples, the low power communication interfaces 876, 878 establish wireless communications with one another in accordance with the Bluetooth LE protocol, the medium power communication interfaces 886, 882 establish wireless communications with one another in accordance with the LoRa communications protocol, and the high-power communication interface 884 establishes wireless communications with the one or more network service servers 804 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 804 of the network service 808 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 804 of the network service 808. The schedule usually dictates all aspects of the communication, including the times when particular tape nodes should communicate, the mode of communication, and the contents of the communication. In one example, the one or more network service servers 804 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 804, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 804.

Figure 9:
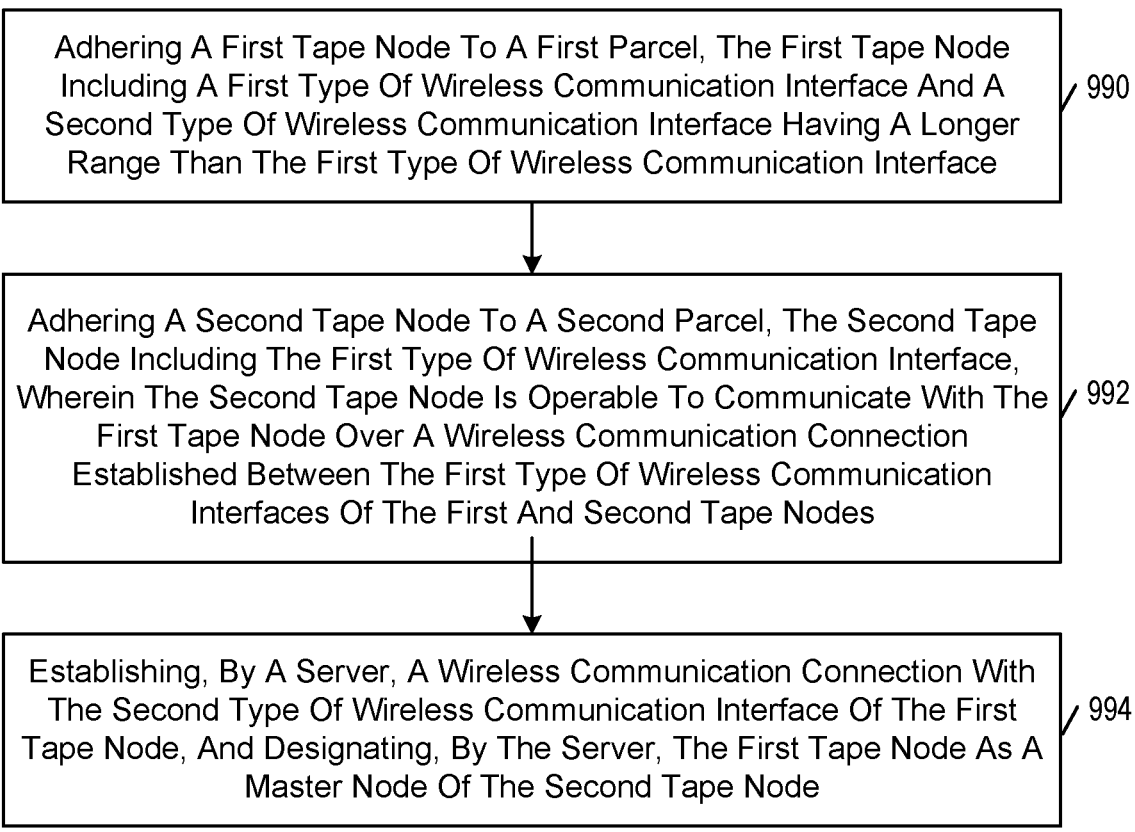
FIG. 9 shows an example method of creating a hierarchical communications network, in an embodiment.

FIG. 9 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9, block 992). An application executing on a computer system (e.g., the one or more network service servers 704 of a network service 708) establishes a wireless communication connection with the second type of wireless communication interface of the first tape node, and the application transmits programmatic code executable by the first tape node to function as a master tape node with respect to the second tape node (FIG. 9, block 994).

Distributed Agent Operating System

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs). In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server. Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
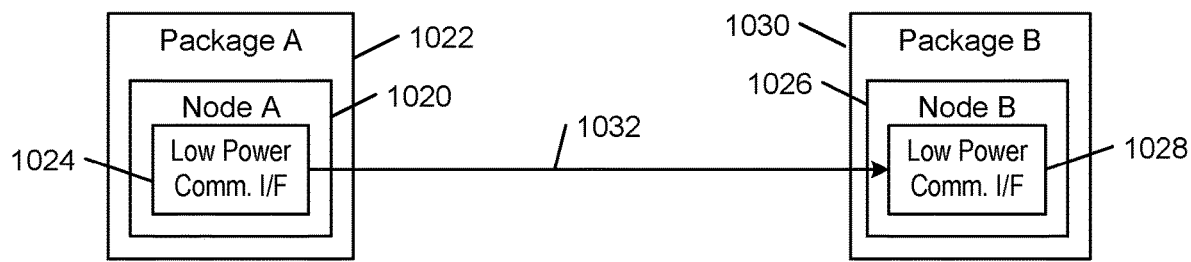
FIGS. 10A-C show example nodes associated with packages, in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
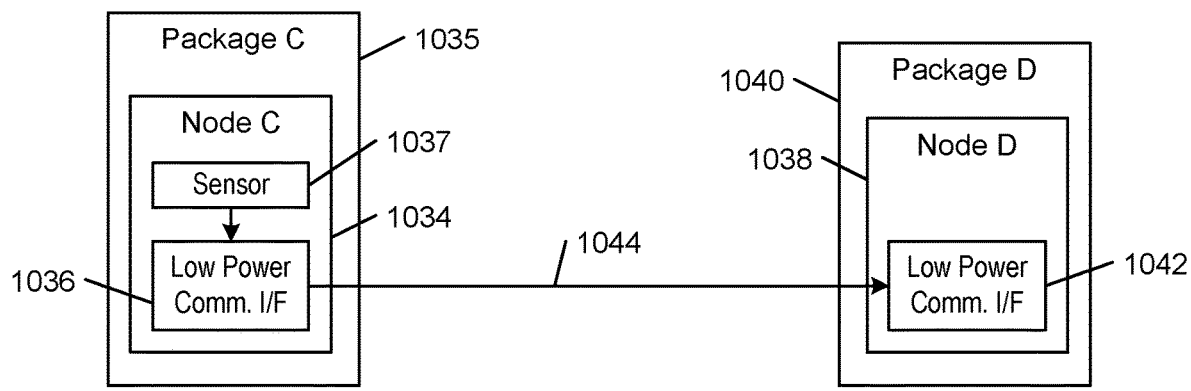

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
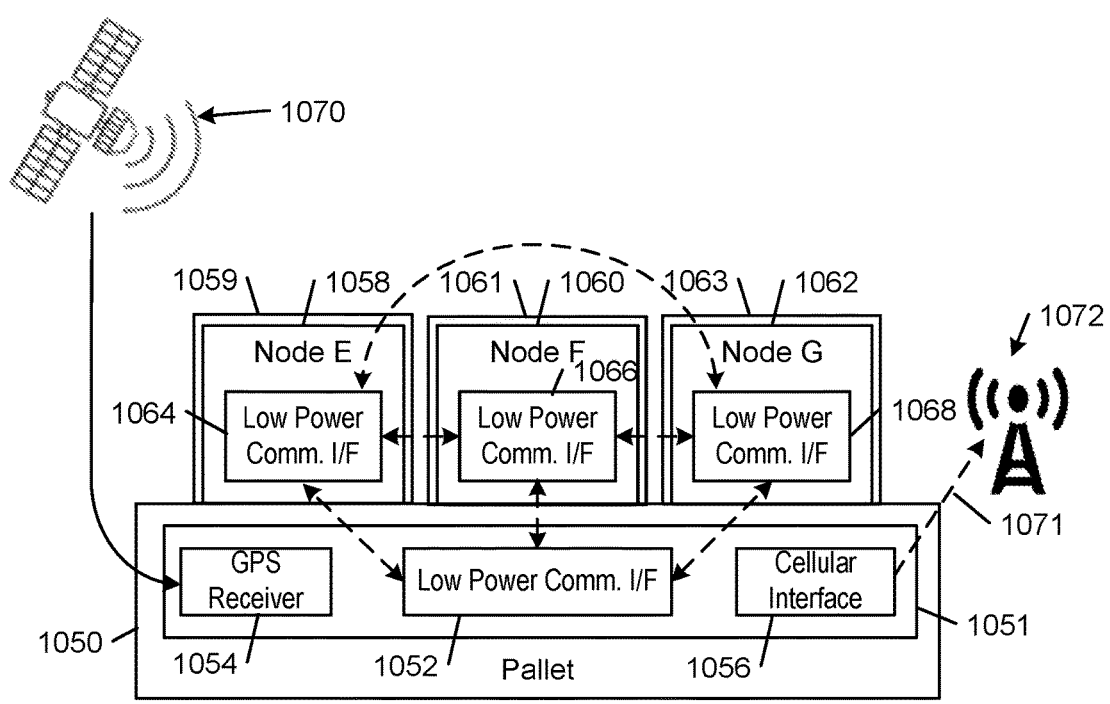

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages. In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
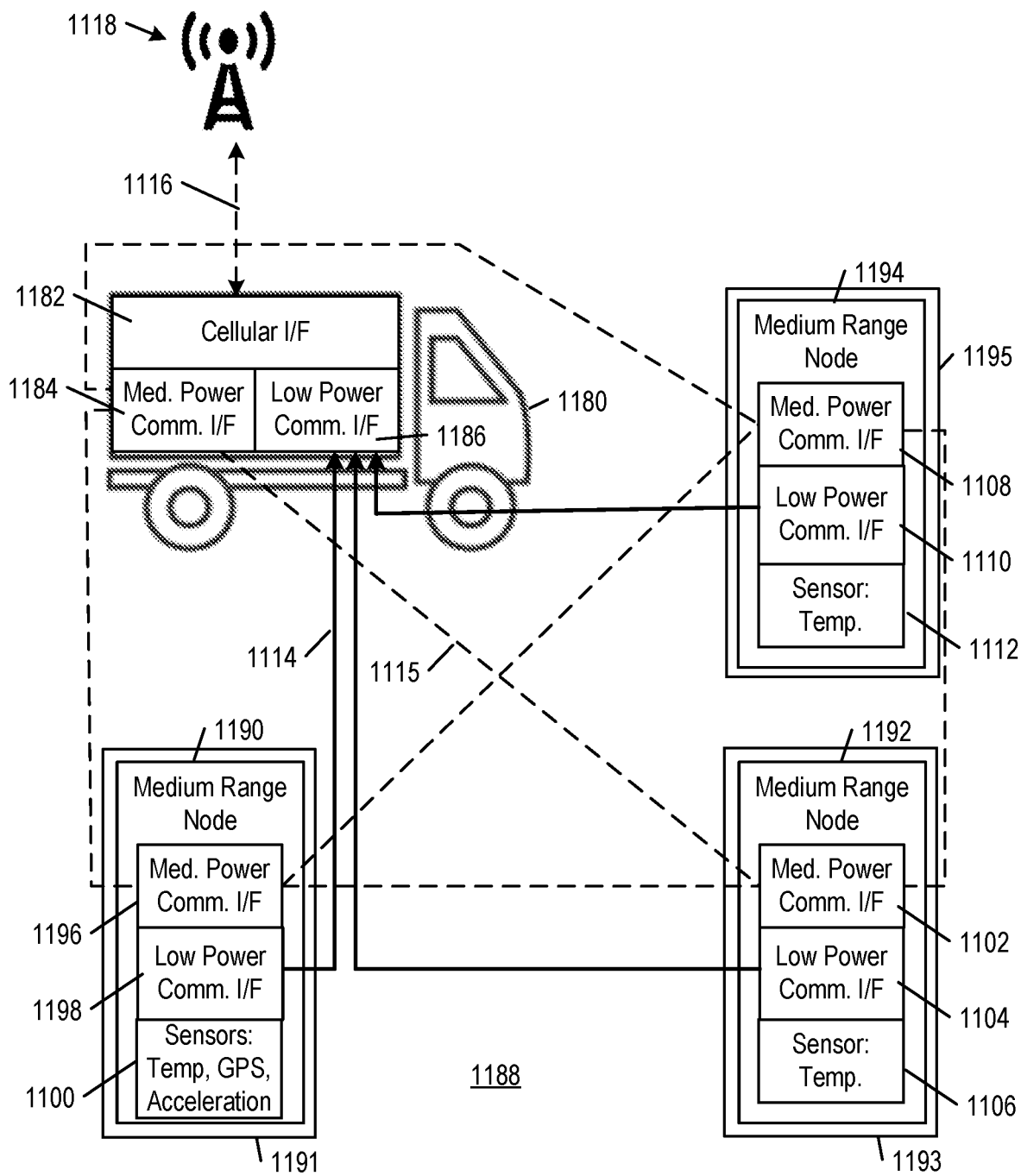
FIGS. 11-12 show a vehicle configured as a mobile node or mobile hub, in embodiments.

Referring to FIG. 11, a truck 1180 is configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
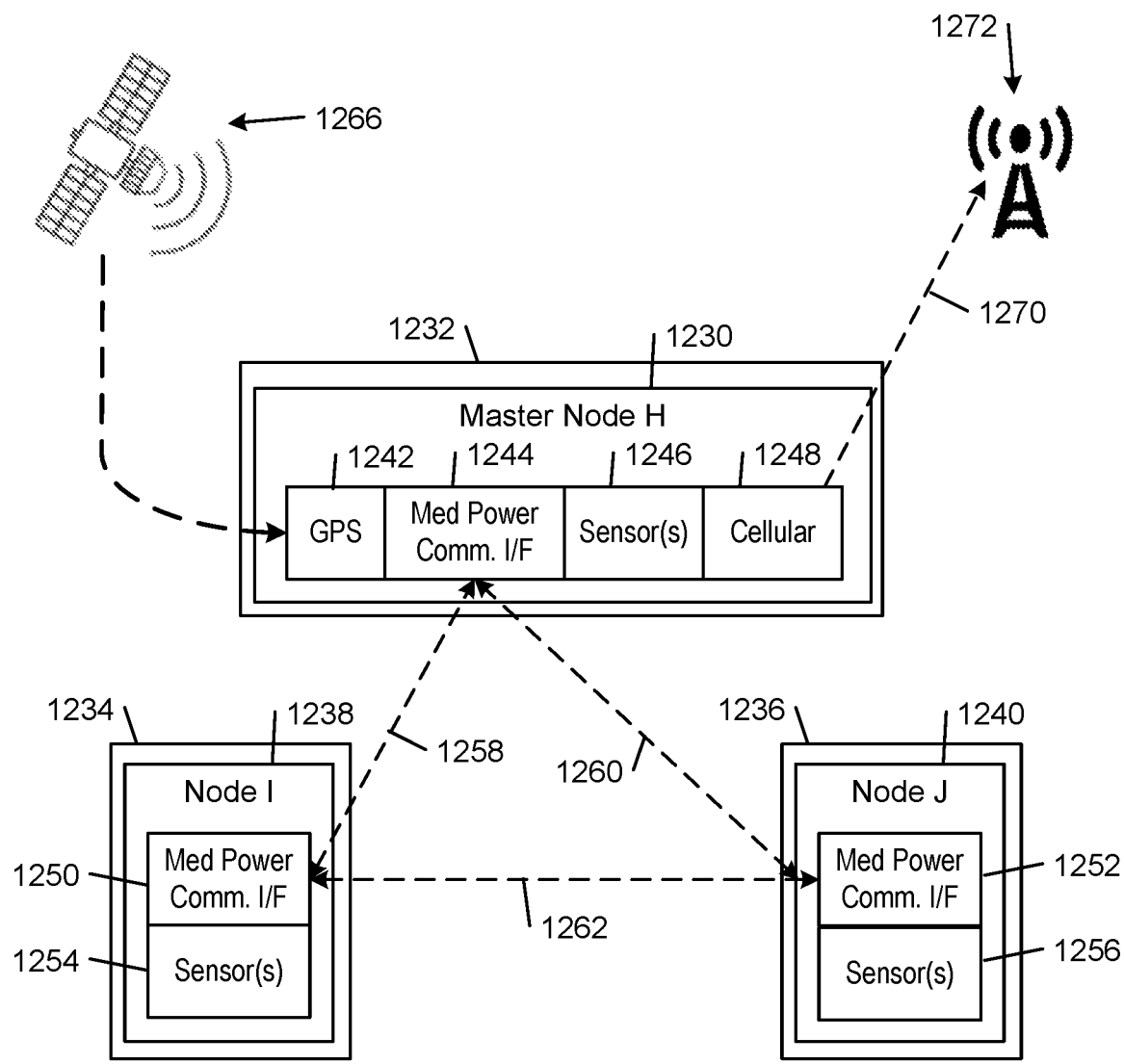

Referring to FIG. 12, a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master 1230 and peripheral nodes 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Figure 13A:
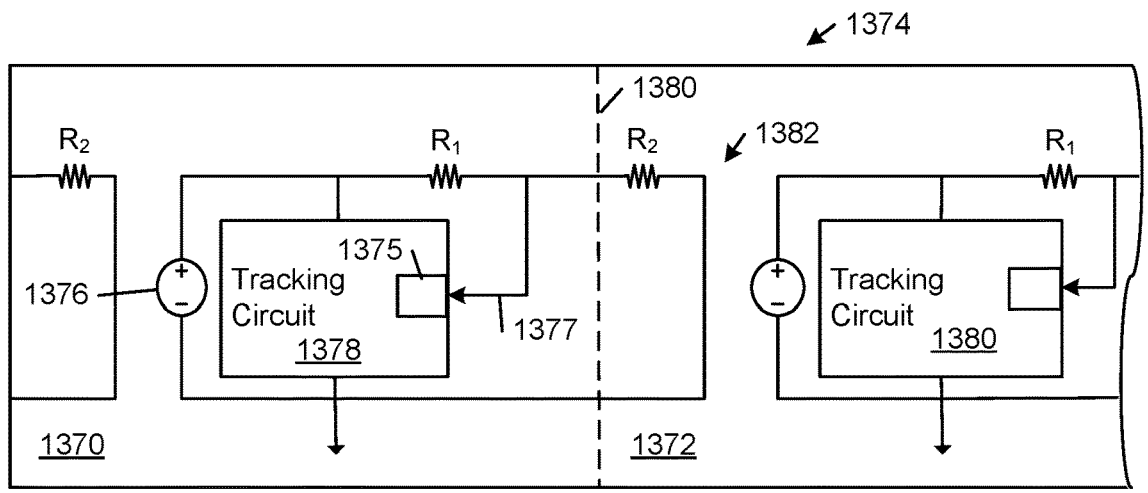
FIGS. 13A-B show example segments of a tracking adhesive product that include power delivery circuits responsive to an event, in embodiments.

Referring to FIG. 13A, in some examples, each of one or more of the segments 1370, 1372 of a tracking adhesive product 1374 includes a respective circuit 1375 that delivers power from the respective energy source 1376 to the respective tracking circuit 1378 (e.g., a processor and one or more wireless communications circuits) in response to an event. In some of these examples, the wake circuit 1375 is configured to transition from an off-state to an on-state when the voltage on the wake node 1377 exceeds a threshold level, at which point the wake circuit transitions to an on-state to power-on the segment 1370. In the illustrated example, this occurs when the user separates the segment from the tracking adhesive product 1374, for example, by cutting across the tracking adhesive product 1374 at a designated location (e.g., along a designated cut-line 1380). In particular, in its initial, un-cut state, a minimal amount of current flows through the resistors R1 and R2. As a result, the voltage on the wake node 1377 remains below the threshold turn-on level. After the user cuts across the tracking adhesive product 1374 along the designated cut-line 1380, the user creates an open circuit in the loop 1382, which pulls the voltage of the wake node above the threshold level and turns on the wake circuit 1375. As a result, the voltage across the energy source 1376 will appear across the tracking circuit 1378 and, thereby, turn on the segment 1370. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 1378 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

Figure 13B:
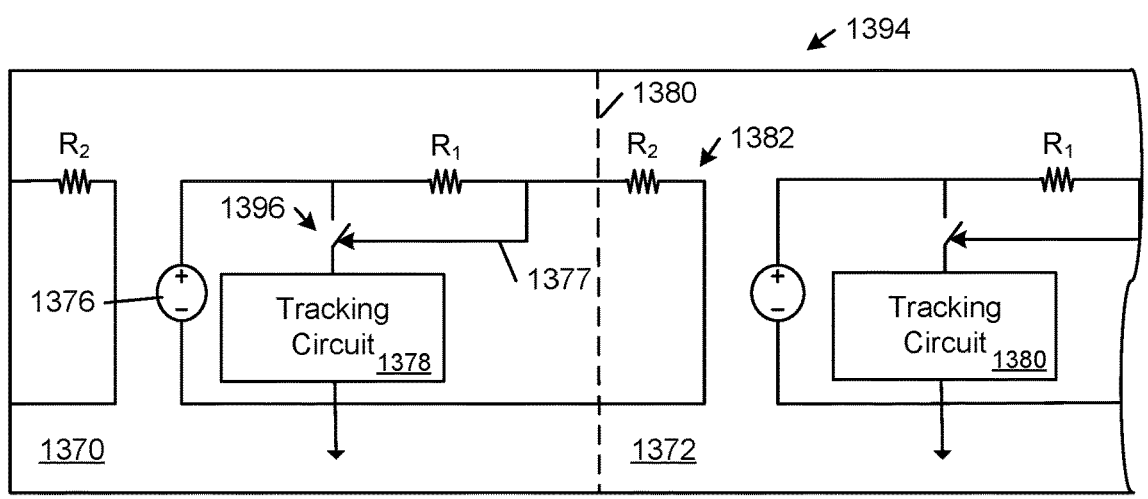

FIG. 13B shows another example of a tracking adhesive product 1394 that delivers power from the respective energy source 1376 to the respective tracking circuit 1378 (e.g., a processor and one or more wireless communications circuits) in response to an event. This example is similar in structure and operation as the tracking adhesive product 1394 shown in FIG. 13A, except that the wake circuit 1375 is replaced by a switch 1396 that is configured to transition from an open state to a closed state when the voltage on the switch node 1377 exceeds a threshold level. In the initial state of the tracking adhesive product 1394, the voltage on the switch node is below the threshold level as a result of the low current level flowing through the resistors R1 and R2. After the user cuts across the tracking adhesive product 1394 along the designated cut-line 1380, the user creates an open circuit in the loop 1382, which pulls up the voltage on the switch node above the threshold level to close the switch 1396 and turn on the tracking circuit 1378.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 13C:
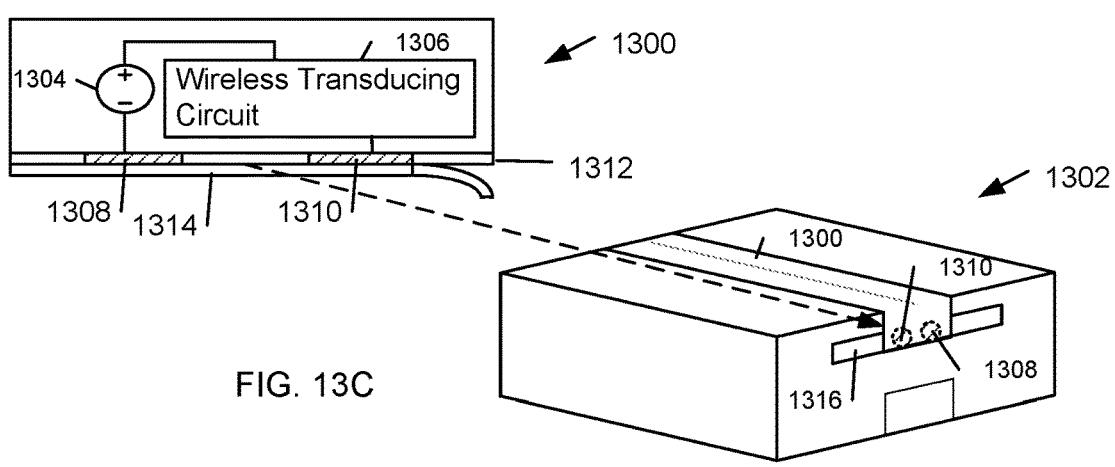
FIG. 13C show the example tracking adhesive product as attached to an asset, in an embodiment.

FIG. 13C shows a diagrammatic cross-sectional front view of an example adhesive tape platform 1300 and a perspective view of an example asset 1302. Instead of activating the adhesive tape platform in response to separating a segment of the adhesive tape platform from a roll or a sheet of the adhesive tape platform, this example is configured to supply power from the energy source 1302 to turn on the wireless transducing circuit 1306 in response to establishing an electrical connection between two power terminals 1308, 1310 that are integrated into the adhesive tape platform. In particular, each segment of the adhesive tape platform 1300 includes a respective set of embedded tracking components, an adhesive layer 1312, and an optional backing sheet 1314 with a release coating that prevents the segments from adhering strongly to the backing sheet 1314. In some examples, the power terminals 1308, 1310 are composed of an electrically conductive material (e.g., a metal, such as copper) that may be printed or otherwise patterned and/or deposited on the backside of the adhesive tape platform 1300. In operation, the adhesive tape platform can be activated by removing the backing sheet 1314 and applying the exposed adhesive layer 1312 to a surface that includes an electrically conductive region 1316. In the illustrated embodiment, the electrically conductive region 1316 is disposed on a portion of the asset 1302. When the adhesive backside of the adhesive tape platform 1300 is adhered to the asset with the exposed terminals 1308, 1310 aligned and in contact with the electrically conductive region 1316 on the asset 1302, an electrical connection is created through the electrically conductive region 1316 between the exposed terminals 1308, 1310 that completes the circuit and turns on the wireless transducing circuit 1306. In particular embodiments, the power terminals 1308, 1310 are electrically connected to any respective nodes of the wireless transducing circuit 1306 that would result in the activation of the tracking circuit 1306 in response to the creation of an electrical connection between the power terminals 1308, 1310.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Locationing and Prioritized Data Transfer Via Available Access Points

The present embodiments realize that locating agents, such as the tape nodes discussed with respect to FIG. 7, are particularly power limited. Locating agents used for tracking parcels even more so because the flexible tape nodes do not have the real estate to support a large battery. Thus, the following systems and methods provide for specific ways to utilize lower-power requirements of wireless communication systems. For example, the systems and methods herein may identify specific access points, and score them using the below-described connection access-point list 1552. This prioritized ranking allows the locating agent to efficiently determine which access point to attempt connection to that will result in the most-likely successful connection. Because of this optimized priority list, the locating agent is not wasting battery power by attempting to connect to an unlikely successful access point. Furthermore, where the access point connected is a Wi-Fi access point, the locating agent utilizes less power than connecting to cellular.

Furthermore, where the access point connected is a Wi-Fi access point, the locating agent, the locating agent utilizes less cost by not requiring cellular data rates. Indeed, in some embodiments herein, the locating agent utilizes a governor to restrict data transmission when only cellular connection can be made (e.g., no Wi-Fi access point is capable of being connected to).

Furthermore, the present embodiments provide additional battery-saving ability by enabling location of a locating agent on-device without requiring external device interaction, such as connecting to a server or GPS-based locating to obtain location of the locating agent. The locating agents herein may utilize triangulation based on one or more identifiable access points to locate, and compare the access points to an on-device known access points list to obtain its current location without needing to connect to another device once the known-access point list is stored in the local memory of the locating agent. Furthermore, the known access point list may be updated based on a global access point list when the current location indicates the locating agent is entering a new area (e.g., passing a geofence), such as a new city, new state, new county, or proximity to a known access point. When updated, the prior-saved known access point data may be deleted thus saving memory requirements of the locating agent.

In an aspect, a method for identifying wireless LAN or Wi-Fi networks and establishing connections to wireless LAN or Wi-Fi networks by wireless nodes for locationing and data transfer during asset transportation and management is disclosed herein. Wireless LAN and Wi-Fi may be collectively referred to as "Wi-Fi" herein. Established Wi-Fi networks, both commercially and privately owned, are increasingly common in retail, storage, and other areas. Wi-Fi networks are identified by SSIDs or other identifiers, are often protected with passwords, and may be associated with additional information such as, for example, a GPS location corresponding to the Wi-Fi network. When a connection between a Wi-Fi network and an electronic device is initialized, however, the connection may be kept alive for a significant period of time (e.g., 64 days) and enables electronic devices to download, upload, and access data via the Wi-Fi network.

Electronic devices used in the wireless tracking system 400 such as wireless tape nodes, gateway devices, other tracking devices for tracking assets, or other such devices may connect to a Wi-Fi network via a Wi-Fi access point or router in order to calibrate or recalibrate settings, to upload and download large data files, communicate with one or more servers, and to perform other functions. In some cases, specific functions and communications are reserved for when the electronic device is connected to the internet via Wi-Fi, in order to optimize or preserve available computational resources and battery life. For example, wireless tape nodes associated with assets being transported or stored may use Wi-Fi networks to upload stored sensor data, to download new relevant data, perform over the air (OTA) updates, to upload information describing events associated with the assets, to download instructions from a wireless tracking system for operations, actions, or modes, and the like.

In an embodiment, a wireless tape node of a wireless tracking system 400 initiates Wi-Fi capabilities. Wi-Fi capabilities enable the wireless tape node to establish a communications connection to a Wi-Fi network via a Wi-Fi communication system integrated in the wireless transducing circuit of the wireless tape node. In some examples, the wireless tape node may be configured to initiate Wi-Fi capabilities responsive to an event occurring, e.g., detecting a loading or unloading event. In other examples, the wireless tape node may be configured to initiate Wi-Fi capabilities at set intervals, e.g., every 24 hours, every 8 hours. In other examples, the wireless tape node may be configured to initiate Wi-Fi capabilities responsive to crossing a geofence, e.g., entering a new city, county, state, country, region, or other area. When Wi-Fi capabilities are enabled, the wireless tape node may search for and detect one or more Wi-Fi networks available in the vicinity of the wireless tape node's current location. Each Wi-Fi network is associated with an SSID and may further be associated with a password or initialization information. A Wi-Fi network may be encrypted, using encryption such as Wired Equivalent Privacy (WEP), Wi-Fi Protected Setup (WPS), Wi-Fi Protected Access (WPA), WPA2, or other types of encryption. The one or more Wi-Fi networks may be, for example, public networks, global coverage networks, or private networks.

The wireless tape node accesses a database of the wireless tracking system for performing locationing and/or tracking of the wireless tape node or an asset associated with the wireless tape node. In some embodiments, the database is stored by a server or cloud of the wireless tracking system. In other embodiments, the wireless tape node may store portions of or the entirety of the database locally. For example, a portion of the database may be downloaded by the wireless tape node based at least in part on an expected trajectory of the wireless tape node. In some embodiments, the portion of the database is downloaded over Wi-Fi when the wireless tape node successfully connects to a Wi-Fi network. The portion of the database may also be preloaded onto the wireless tape node at an initialization prior to the start of a journey or task, in some embodiments. The database comprises entries associated with known Wi-Fi networks in areas that wireless tape nodes of the wireless tracking system 400 may travel through. An entry may comprise, for example, a name of a Wi-Fi network, an SSID of the Wi-Fi network, a password of the Wi-Fi network, a location (e.g., GPS coordinates and/or data) corresponding to the Wi-Fi network, a category or owner of the Wi-Fi network, a success rate or probability for nodes of the wireless tracking system attempting to access the Wi-Fi network, a login time (e.g., the most recent time a wireless tape node successfully connected to the Wi-Fi network) of the Wi-Fi network, initialization data for the Wi-Fi network, previously recorded received signal strength (e.g., RSSI) values, peak received signal strength values, known wireless connection range for the access point, a model of a device corresponding to the access point, a MAC address associated with the access point, and a priority score for the Wi-Fi network. The priority score may indicate a preference for connecting to the Wi-Fi network associated with the priority score. For example, if two Wi-Fi networks associated with database entries are available in the vicinity of a wireless tape node, the wireless tape node first attempts to connect to the Wi-Fi network with a higher associated priority score, according to some embodiments. In some embodiments, the priority score of a Wi-Fi network is based at least in part on security and/or privacy of the Wi-Fi network.

In an embodiment, the database is populated based on third party information, e.g., entries are pulled from third party databases tracking Wi-Fi networks. In another embodiment, the database may instead or additionally be populated using calibration tape nodes configured to record information about Wi-Fi networks encountered during transportation. In some embodiments, the calibration tape nodes include GPS communication systems for performing GPS location tracking, but the calibration tape nodes may track location using data other than GPS data. For example, the calibration tape nodes may capture, store, and upload data describing interactions with Wi-Fi networks in association with a GPS coordinate corresponding to the Wi-Fi network. When in an area, the calibration tape node may search for available Wi-Fi networks in the area. The calibration tape node may store information about Wi-Fi networks that it has found on its storage. In some embodiments, the information includes location data for the Wi-Fi network. In a further embodiment, the calibration tape node estimates a geographic location of the Wi-Fi network based on the current location of the calibration tape node. The geographic location of the Wi-Fi network may be estimated relative to the current location of the calibration tape node based on the signal strength or received signal strength indication (RSSI) for signals broadcasted by the Wi-Fi network that are detected by the calibration tape node. When the calibration tape node successfully connects to a Wi-Fi network, the calibration tape node uploads the stored information to the database, adding entries for Wi-Fi networks that do not have associated entries in the database and updating entries in the database that are associated with Wi-Fi networks that the calibration tape node has collected information on.

The calibration tape node may be an embodiment of the adhesive tape platform 13, according to some embodiments. In other embodiments, the calibration tape node has a different form factor (e.g., a rigid form factor). For example, the calibration tape node may be a gateway device that is integrated with a vehicle, like the mobile gateways 412. In other embodiments, the calibration tape node is a client device (e.g., a smartphone, tablet, or PC). In other examples, the calibration tape nodes may additionally or instead have other sensors and may capture, store, and upload data describing interactions with Wi-Fi networks in association with other sensor data captured by the sensors at a time of connection to the Wi-Fi networks, such as occurrence of a loading or unloading event, arrival at a retail or storage location, inability to access a particular other communications system, and the like.

Wireless tape nodes identify one or more Wi-Fi networks in a current area corresponding to entries in the accessed database. The wireless tape nodes establish a connection to one of the Wi-Fi networks. In some embodiments, the Wi-Fi network is selected based at least in part on a signal strength of the Wi-Fi network, e.g., such that a Wi-Fi network with a strongest signal is selected for connection. In some embodiments, the Wi-Fi network is selected based at least in part on information stored in the database about one or more possible Wi-Fi networks. For example, the selected Wi-Fi network may have a high priority score indicating that it is flagged as being prioritized for selection, a high success score indicating that other tape nodes of the wireless tracking system have previously had a high rate of success in connecting to the Wi-Fi network, stored initialization data, and/or a category corresponding to prioritization for selection (e.g., public or global coverage network).

Once the connection to the Wi-Fi network has been established, the wireless tape node may download or upload data to a server or cloud of the wireless tracking system, and may receive data from the Wi-Fi network describing location and other environmental factors. In an embodiment, the wireless tape node receives geographic (e.g., GPS) coordinates or other location information from the Wi-Fi network. In some embodiments, the wireless tape node has downloaded and stored the data on the Wi-Fi network before it has established the connection. For example, the wireless tape node may download a portion of the database that includes Wi-Fi networks that are within a threshold distance of a path that the asset will take during the asset's journey or delivery, before the asset and the wireless tape node begin the journey or delivery. In further embodiments, the wireless tape node may be initialized with the portion of the data before or relatively concurrently with when the wireless tape node is installed on the asset. The wireless tape node may determine, based at least in part on the accessed geographic coordinates and a received signal strength of the Wi-Fi network, a respective location of the wireless tape node. The wireless tape node transmits the respective location to the wireless tracking system, according to some embodiments. In other embodiments, the wireless tape node transmits the received signal strength and an identifier for the Wi-Fi network that it is connected to (e.g., an SSID, a unique identifier assigned by the wireless tracking system, or some other identifier), and the wireless tracking system determines the estimated location of the wireless tape node. The wireless tracking system may then provide notification of events or updates about the transportation of the asset to an end user, e.g., by transmitting a notification to a client device of an end user that the asset has arrived at the location. For example, the wireless tracking device may transmit a notification to a client device of an end user that includes an updated projected delivery date.

In another embodiment, the wireless tape node uploads locally stored data, such as sensor data captured during transportation of the wireless tape node, to the wireless tracking system. In another embodiment, the wireless tape node downloads information from the wireless tracking system. For example, the wireless tape node downloads portions of or all of a database comprising updated or newly relevant information. For example, a wireless tape node connecting to a Wi-Fi network having GPS coordinates or other location data corresponding to having entered a new country downloads a portion of a database comprising information relevant to the new country, ensuring that the wireless tape node has all relevant information to the new country without requiring local memory of the wireless tape node store all possible information at all times. In another example, a wireless tape node downloads updated or newly relevant instructions from the wireless tracking system. The instructions may be, for example, one or more of: An instruction to enter a hibernation or other low-frequency communication mode; an instruction to enter a high-frequency communication mode; an instruction to enable or disable a particular communications system; an instruction to capture particular sensor data; an instruction to upload locally stored data; and the like. The instructions may also include instructions to delete data from the storage of the wireless tape node that is no longer relevant to the asset or the remainder of the journey for the asset and the wireless tape node. For example, the wireless tape node may delete the data for Wi-Fi networks that are along a completed portion of the path that the wireless tape node takes during a journey.

Use of Wi-Fi networks to upload and download large data files or data files that become relevant responsive to wireless tape nodes entering particular areas enables wireless tape nodes to reduce the amount of data stored locally at any given time during transportation of assets. Further, because Wi-Fi networks are associated with GPS coordinates and other location data, leveraging the available location data for Wi-Fi networks enables wireless tape nodes to provide accurate and up-to-date location information of assets throughout transportation of the assets without requiring GPS sensors.

Figure 14:
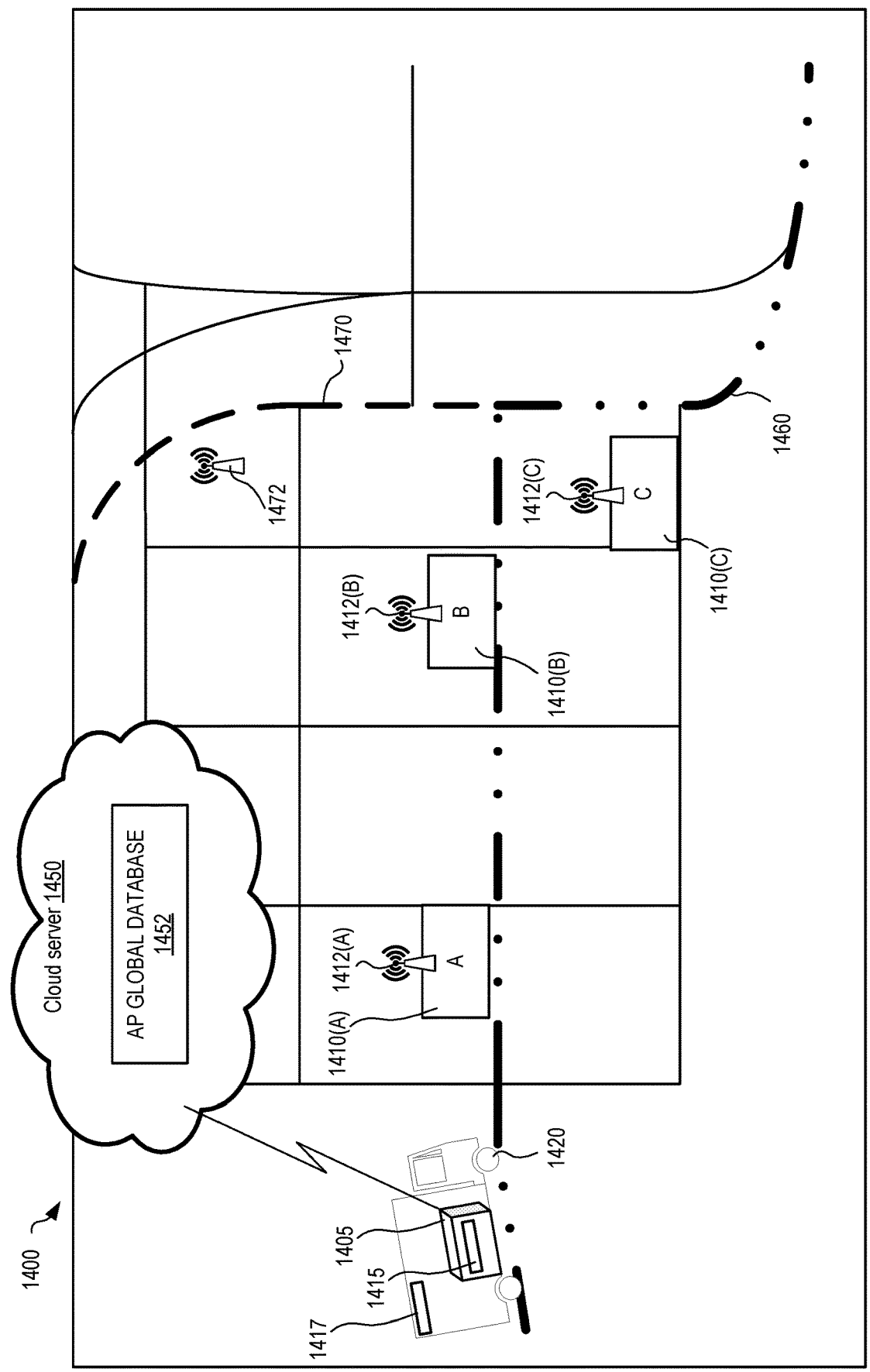
FIG. 14 is a diagrammatic view of an example environment of a locating agent configured to identify and access Wi-Fi networks for locating and data transfer.
Figure 15:
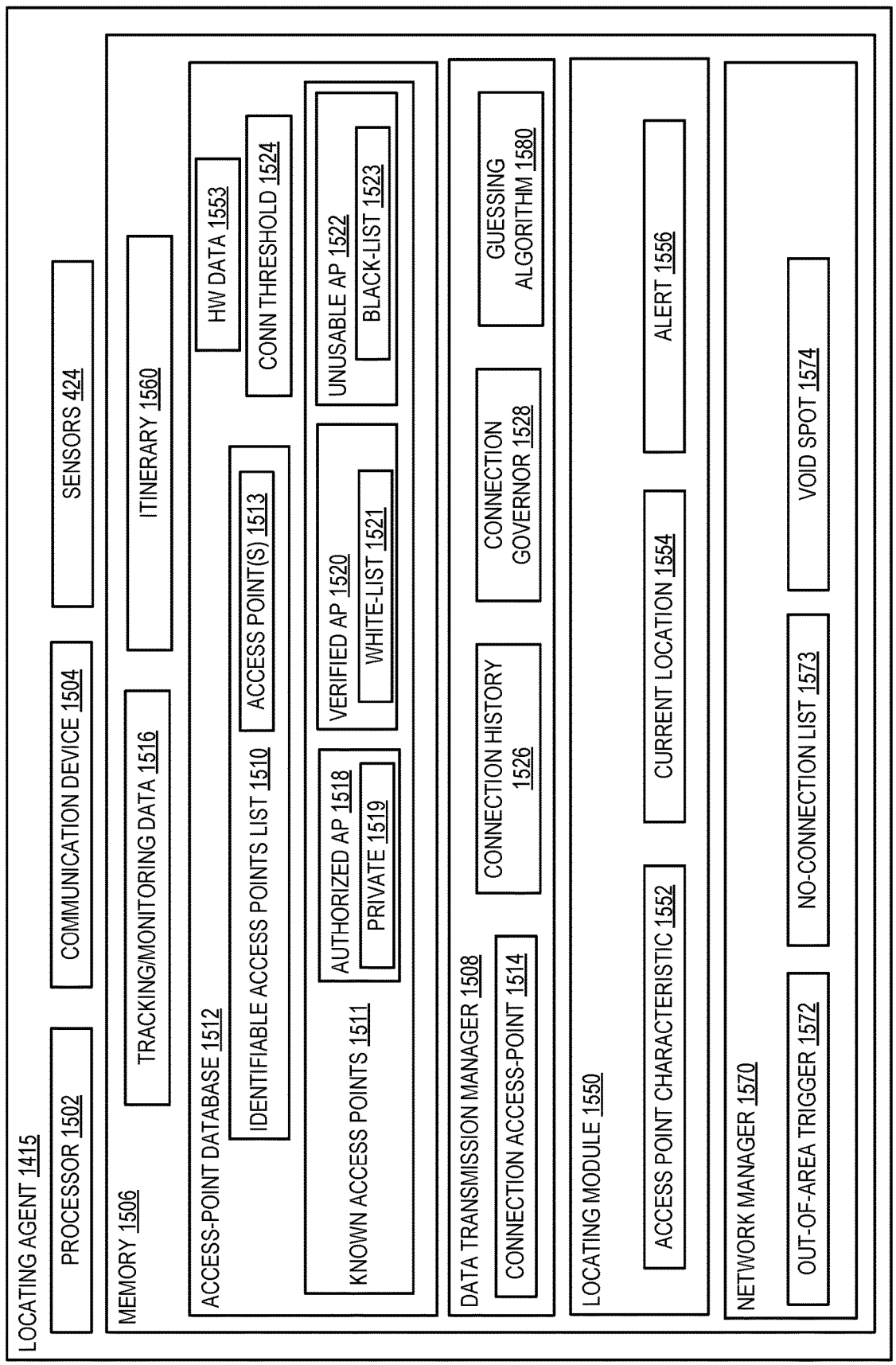
FIG. 15 shows block diagram of example components included in locating agent, in embodiments.

FIG. 14 is a diagrammatic view of an example environment 1400 of a locating agent 1415 configured to identify and access Wi-Fi networks for locating and data transfer. FIG. 15 shows block diagram of example components included in locating agent 1415, in embodiments. FIGS. 14 and 15 are best viewed together with the following description. Locating agent 1415 may be wireless tape node and a component of a wireless tracking system, such as the wireless tracking system 700 of FIG. 7, discussed above.

An asset 1405 associated with a locating agent 1415 enters the environment 1400 that includes one or more buildings 1410, each having wireless access points 1412. Wireless access point 1412 may be any wireless access point identifiable by the locating agent 1415, such as Wi-Fi (802.11, 802.11ac, 802.11n, 802.11g, or any other Wi-Fi protocol), cellular access points (such as cellular towers, gnB access points, or other devices known in the art), radio-access points, etc. Although wireless access points 1412 are shown at or within a building, they need not be at or within a building. In this example, the asset 1405 is being transported on a vehicle 1420. The vehicle 1420 is travelling on a route 1460 (shown in bold, dash-dot-dot line) that passes building 1410(A), building 1410(B), and building 1410(C) of the environment 1400. The environment 1400 is only one example, and the asset 1405 and the locating agent 1415 may be present in other environments with different areas and features. For example, instead of a multi-road environment (such as that represented in FIG. 14), the asset 1405 and the locating agent 1415 may be in an environment that includes an interior of a building with access points (e.g., Wi-Fi access points) or networks throughout the building.

The locating agent 1415 may be any of the "tape nodes", "nodes", or "agents" discussed herein, such as discussed above with respect to FIGS. 1-13. In a particular embodiment, the locating agent 1415 includes wireless communication capabilities and is configured to initiate wireless capabilities (i.e., activate its Wi-Fi, cellular, LoRA, Bluetooth, Zigbee, etc. communication system). In an embodiment, the locating agent 1415 is configured to initiate wireless communication capabilities responsive to detecting a change of environment, e.g., detecting location data indicating that the locating agent 1415 is crossing a geofence, such as one or more of a new city, county, state, country, a building, an indoor area, an outdoor area, or some other area. In another embodiment, the locating agent 1415 is configured to initiate wireless communication capabilities responsive to detecting an event, e.g., sensor data or location data corresponding to a loading or unloading event. In another embodiment, the locating agent 1415 is configured to initiate wireless communication capabilities at time intervals, e.g., every 8 hours, or at scheduled dates and times.

As vehicle travels through environment 1400, the locating agent 1415 detects the wireless networks established by access points 1412(A), 1412(B), 1412(C) associated with respective buildings 1410(A), 1410(B), 1410(C), when in wireless range thereof, and may use these wireless networks to perform one or more of locating functionality and data transfer functionality.

Referring to FIG. 15, locating agent 1415 may be implemented as a stand-alone device and includes a processor 1502, a communications device 1504, and memory 1506. Additionally, or alternatively, one or more components of the locating agent 1415 may be integrated into one or more of the devices discussed herein, such as, but not limited to, tape-agent platform 112, 330, or 500 (e.g., one segment 113, 332, or 502 thereof), a component of the wireless transducing circuit 410 discussed above, a component of segments 640, 670, or 680 of agent platforms in FIGS. 6A-C, a component of server 704 and/or application(s) 806, a component of mobile gateway 710 and/or client application 722, a component of any one of tape nodes in FIG. 7, or any other device within the wireless tracking system 700 of FIG. 7.

Locating agent 1415 thus implements a firmware or software module that include machine-readable instructions that, when executed by the processor 1502, implements the functionality of the locating agent 1415 as discussed herein. Locating agent 1415 may utilize the communications device 1504 to receive data from or transmit data to external devices (such as tape nodes, or a server, or a client device) via one or more of a low-power, medium-power, or high-power wireless communication interface as discussed herein.

Locating Agent Connection Prioritization for Data Transmission

The locating agent 1415 may include a data transmission manager module 1508. Data transmission manager module 1508 includes machine-readable instructions that, when executed by the processor 1502, implement any one or more of the functionality discussed herein with respect to the data transmission manager module 1508. In some embodiments, the data transmission manager module 1508 may analyze an identifiable access point list 1510 and an access-point database 1512 to select at least one access point 1513 from the identifiable access point list 1510 (e.g., one or more of access points 1412) for transmitting tracking/monitoring data 1516 acquired by the locating agent 1415. Tracking/monitoring data 1516 may include any one or more of the data sensed by the tape nodes, agents, and modules herein (such as the data captured by sensing transducers 424 of FIG. 4), or other data received by the locating agent 1415 from other agents (e.g., any device within system 700) stored within local memory 1506 of the locating agent 1415.

Data transmission manager module 1508 may advantageously identify an connection access-point list 1514, as a prioritized listing of one or more of the access points 1513 identifiable by the locating agent 1415. Data transmission manager module 1508 may then control locating agent 1415 to attempt to connect and transmit on one or more of the access points 1513 having the highest priority as defined in the connection access-point list 1514.

The access-point database 1512 may include entries describing known wireless communication networks and associated information about the wireless communication networks, e.g., passwords, initialization information, success rates of connections, priority scores, and the like, as described further in conjunction with FIG. 16. In some embodiments, the locating agent 1415, stores an identity of each access-point 1513 it encounters as an individual entry within identifiable access points list 1510. For example, the locating agent 1415 scans one or more frequency bandwidths and receives beacons (e.g., including SSID, or other identifying information) of near-by access points (e.g., access points 1412) and store said scanned information as an access point 1513 entry in identifiable access points list 1510. FIG. 16 shows an embodiment of an access-point database 1600, which is an example of access-point database 1512. The database 1600 is shown with Wi-Fi connectivity information, but it should be appreciated that information on other types of wireless communication protocols may be included (either in addition to or alternately) without departing from the scope hereof. Database 1600 includes information about Wi-Fi networks known to the wireless tracking system (e.g., wireless tracking system 700) that the locating agent 1415 is a component of. In one example of operation, locating agent 1415 selects at least one of the access points 1513 defined in identifiable access points list 1510 (e.g., one of networks established by access points 1412(A), 1412(B), 1412(C)) to establish a communication connection with based on the priority listing in the connection access-point list 1514. Thus, connection access-point list 1514 may define appropriate ones of the access points 1513 that are listed in the identifiable access point list 1510 and thereby reduce battery power and processing power associated with attempting to connect and transmit on an access point 1513 that is identifiable, but not likely to succeed in connection.

As shown in FIG. 16, the database 1600 comprises entries corresponding to known access points. For example, the entries "StorageWiFi01," "RetailWiFiABC," and "CoffeeshopWiFi" may correspond to access points 1412(A), 1412(B), and 1412(C) shown in FIG. 14, respectively. Each entry includes a Network ID (SSID), a password, a priority score, and GPS coordinates for the known access point. However, the entries may additionally or alternatively include one or more of: a name of the access point network (e.g., a Wi-Fi network), a success score corresponding to a number or percentage of successful attempts to connect to the access point network by other nodes in the wireless tracking system; a category or owner of the access point network; a unique identifier for the access point network that is different from the SSID; a subscription associated with the access point network; a date and time associated with a previous successful connection to the access point network by one or more tape nodes; a quality of the access point network; a speed associated with the access point network; a radio frequency band associated with the access point network; a signal range associated with the access point network; stored initialization information for the access point network; and whether the access point is in a white-list 1521 or black-list 1523. In the embodiment of FIG. 16, the Wi-Fi networks are organized based on state. In other embodiments, the Wi-Fi networks may be organized based on other factors, e.g., different scale of areas, such as cities or counties, by owner or category of Wi-Fi network, by priority score, by distance from a route or path, and the like.

In an embodiment, the database 1512 is received by the locating agent 1415 from an external device (e.g., a gateway node, another tape node, a server, etc.) and may be at least part of a global database 1452 of a cloud or server 1450, which may be an embodiment of the server 704 of FIG. 7, and accessible by members of the wireless tracking system. In another embodiment, the access-point database 1512 stored in the local memory 1506 of locating agent 1415 is only a portion of the global database 1452, or the database is locally stored on a gateway node, client device, another tape node, or master node associated with the asset or a group of assets. The global database 1452 and/or the access-point database 1512 may be populated based on third-party databases and/or by calibration tape nodes, as described above.

The database 1512 may define known access points 1511 and their associated information. The known information 1511 may include, but is not limited to, a name of a network established by each access point, an SSID of the network established by each access point, a password of the network established by each access point, a location (e.g., GPS coordinates and/or data) corresponding to the access point, a category or owner (or service) of the access point, a success rate or probability for nodes of the wireless tracking system attempting to access the network established by each access point, a login time (e.g., the most recent time a wireless tape node successfully connected to the network established by each access point) of the network, initialization data for the network established by each access point, previously recorded received signal strength (e.g., RSSI) values, peak received signal strength values, known wireless connection range for the access point, prior recorded upload/download speeds associated with the network established by the access point, a model of a device corresponding to the access point, a MAC address associated with the access point, and a priority score for the network, geographic location, etc. The geographic location may be identified within a public database such as when one or more of the access points are a publicly available access point such as a coffee shop, restaurant, library, or other publicly accessible networks.

Known access points may include, in an embodiment, any one or more of a plurality of authorized access points 1518, a plurality of verified access points 1520, and a plurality of unusable access points 1522. Authorized access points 1518 defines access points that have verified login information. For example, the locating agent 1415 may receive from a device operated by an authorized user of the authorized access point, the login information (e.g., security key, login username, login password, etc.) associated with given access points. If the access point is authorized by the user, it may be utilized by one or more locating agents for data transmission. Authorized access points 1518 may further include private access points 1519 and networks which may not be broadcasting their SSID, but the wireless tracking system has been provided with private access credentials (such as network name and password). The locating agent 1415 may use the private access credentials to periodically scan the authorized access points 1518 and determine if a private access point defined therein is available to include as identifiable access points 1513 in identifiable access point list 1510.

Verified access points 1520 defines access points that one or more other locating agents have successfully connected with and implemented transmission of data. In one embodiment, a verified access point 1520 defines access points having a detected signal strength, connection ease (e.g., speed at which a previous locating agent is capable of connecting to the given access point), and/or reliability of the network established by the given access point that meet a verification threshold 1524.

Known access points 1511 may further include white-list access points 1521 (which may be a subset of the verified access points 1520) that define those access points which include a combination of security, ease of connection, reliability of network, known output signal strength or RSSI that make said access point desirable for connection thereto. In an embodiment, whitelisted access points 1521 may be known to be safe for connection. In an embodiment, whitelisted access points 1521 may be operated by services that have opted in to a mesh network program specifically dedicated to use by locating agents 1415.

Unusable access points 1522 defines an access point as unusable when one or more other locating agents have not been able to successfully connect to a given access point, or a device operated by an authorized user of the given access point transmits a deny signal indicating that the access point is not to be used. In one embodiment, an unusable access point 1522 may be indicated as unusable if a detected signal strength, connection ease (e.g., speed at which a previous locating agent is capable of connecting to the given access point), or reliability of the network established by the given access point does not meet the verification threshold 1524.

Known access points 1511 may further include black-list access points 1523 (which may be a subset of the unusable access points 1522) that define those access points which include a combination of security, ease of connection, reliability of network, known output signal strength or RSSI that make said access point undesirable for connection thereto.

The data transmission manager 1508 may generate the connection access-point 1514 as a list of prioritized access points based on likelihood of success for connecting and transmitting the tracking/monitoring data 1516. The prioritization may be based on, but is not limited to, any one or more of connection speed (upload/download), current signal strength (RSSI), time-to-connect, type of connection (e.g., Wi-Fi, Cellular, Bluetooth, Bluetooth Low Energy, Zigbee), accessibility (such as verified or unverified, prior connection thereto by the locating agent or another agent in the wireless tracking system, login credentials verified), and the like. Thus, in one embodiment, the priority ranking defined by connection access-point list 1514 can be modified by the RSSI detected by the locating agent 1415. For example, if signal strength is low or the locating agent 1415 is far away from a given access point, the connection may be unstable or unreliable for transferring data. The locating agent 1415 may prioritize access points that have a good reception/ signal strength. The connection access-point 1514 may also include encryption requirements for connecting to each access point, or for transmitting data to and from (e.g., public Wi-Fi networks may need to be encrypted in a different manner than an access point to which the user has submitted their password/security information to as indicated in authorized access point data 1518). For example, data transmission manager 1508 may analyze the access points 1513 in the identifiable access point list 1510 and compare them to the known access points 1511, including one or more of the authorized access points 1518, verified access points 1520, and unusable access points 1522. Prioritizing the access points 1513 in the connection access-point 1514 advantageously allows the data transmission manager module 1508 to direct the locating agent 1415 to the most likely available and usable access point 1513 and prevent wasted energy and computing power in attempting to connect to ones of the access points 1513 are not likely to be available and usable. Successful transmission is particularly important to the wireless tracking system environment because locating agent 1415 is likely to be on-the-move (e.g., in parcel tracking environment 1400). Thus, the locating agent 1415 needs to be able to connect and upload data in a reliable and efficient manner as soon as a potential upload is available. In situations where the access point 1514 is a non-cellular access point (e.g., Wi-Fi or Bluetooth or Bluetooth Low Energy), use of the non-cellular access point saves battery of the locating agent 1415 by using lower-power communication systems. Therefore, using known access points 1511, such as authorized access points 1518 that are also verified access points 1520, and avoiding unusable access points 1522 improves communication reliability and efficiency of the locating agent 1415. For example, even when an access point is authorized (e.g., included in authorized access points 1518 list), the speed or ease of connection may not meet connection threshold 1524, and thus an authorized access point may be listed in the unusable access points 1522 list. This prevents improper prioritization of the access points for use by the locating agent 1415.

Responsive to the data transmission manager 1508 selecting a connection access-point 1514 (e.g., as the access point 1412(A) in the example of FIGS. 14 and 16), the locating agent 1415 attempts to establish a communication connection to the network established by the highest priority access point listed in the connection access-point list 1514. If the locating agent 1415 is unsuccessful in connecting with the connection access-point 1514, the locating agent 1415 may attempt to establish a connection with another access point 1513 of the identifiable access points 1510 based on the priority listed in the connection access-point list 1514 generated by the data transmission manager 1508.

In embodiments, the data transmission manager 1508 implements a connection governor module 1528 that limits data transmission based on whether or not the locating agent 1415 is connected to a device listed within the connection access-point list 1514. For example, the connection governor module 1528 may limit the amount of data that is transmitted based on the type of access point. If the locating agent 1415 is connected to a cellular-based access point, then the connection governor module 1528 may only allow data transmission of a certain type (e.g., SMS messages, or other non-expensive messaging formats), or of a certain size (e.g., under a certain threshold data size). Similarly, if the locating agent 1415 is able to connect to a Wi-Fi access point, based on the connection access-point list 1514, then the connection governor module 1528 allows any size of data transmission, or limits the data transmission size based on access-point limits (such as upload/download speed) as indicated for the connected access point in the connection access-point list 1514.

In further embodiments, data transmission manager 1508 maintains a connection history 1526 indicating successful and unsuccessful transmission attempts by access-point. Successfully connecting to a given access point enables the agent 1415 to upload or download data to a server or cloud of the wireless tracking system or with another node (e.g., gateway node, other tape node, etc.) associated with the asset or a set of related assets. Connection history 1526 may include other information, such as connection speed (upload/download), signal strength, time-to-connect, etc. that may be used by the data transmission manager 1508 (or other locating agents) in prioritizing access points 1513 for connection to generate connection access-point list 1514. Thus, the locating agent 1415 may transmit, using communication device 1504, the connection history 1526 to the server 1450 for updating of global database 1452.

Locating Agent Self-Locating Functionality

The locating agent 1415 may additionally or alternatively implement a locating module 1550 that monitors the access points 1513 in the identifiable access point list 1510 of the access points 1412 and compares the information thereof to the known access points 1511 identified in the access-point database 1512. Locating module 1550 includes machine-readable instructions that, when executed by the processor 1502, implement any one or more of the functionality discussed herein with respect to the locating module 1550.

The locating module 1550 may analyze access point characteristic data 1552 for each of the access points 1513 in the identifiable access point list 1510 to determine the current location 1554 of the locating agent 1415. In embodiments, the locating agent 1415 determines the access point characteristic data 1552 as an SSID of the access point. In embodiments, the locating agent 1415 determines the access point characteristic 1552 as a signal strength (e.g., RSSI) from each of the access points 1513 in the identifiable access point list 1510 (e.g., access points 1412(A), 1412(B), 1412 (C) as locating agent 1415 travels along route 1460 in FIG. 14). Additionally, or alternatively, the access point characteristic data 1552 may include geographic (e.g., GPS) coordinates or other location data received by the locating agent 1415 from each access points 1513 in the identifiable access point list 1510. Additionally, or alternatively, the access point characteristic data 1552 includes receiving geographic coordinates or other location data that are associated with the known access points 1511 from the database 1512. The locating agent 1415 may compare the information associated with each of the access points 1513 in the identifiable access point list 1510 with the access-point database 1512 to determine a current location 1554 for the locating agent 1415 (e.g., based on the respective signal strengths associated for each access points 1513 in the identifiable access point list 1510 and the known locations of the access points 1412 defined in the access-point database 1512). For example, the locating agent 1415 performs a triangulation calculation based geographic data or other location information corresponding to the access points 1412 and the RSSI signals received by the communication device 1504 as identified in the access point characteristic data 1552. In other examples, the current location 1554 is an estimated position of the locating agent 1415 is determined based on received signal strength from less than three access points 1412 as identified in the access point characteristic data 1552. The estimated position may define a region containing the locating agent 1415.

In one example of operation, determining the current location 1554 includes receiving a plurality of access point characteristic data 1552 for each access point, and analyzing the changes in the plurality of access point characteristic data 1552 over time as the locating agent 1415 moves in relation to each access point 1412. Furthermore, in cases where the access point 1412 hardware is unknown (e.g., when the access-point database 1512 does not include identifying information that indicates what the broadcasting range information is), the locating module 1550 may estimate the current location 1554 based on the access point characteristic 1552 and an estimated access point data 1553. The estimated access point data 1553 may include generally-available information about standard access points that is used by the locating module 1550 to provide an estimate of the current location based on known information. For example, the estimated access point data 1553 may include maximum, median, or average broadcast signal strength information (such as broadcast range, broadcast signal strength, etc.). The estimated access point data 1553 may be defined for a plurality of types of access points (e.g., a 2.4 gHz Wi-Fi access point, a 5 gHz Wi-Fi access point, a cellular access point, a LoRa access point, etc.). Moreover, the estimated access point data 1553 may include a plurality of potential access point data values (e.g., Wi-Fi routers may be set to have a first range of 150 feet indoors and 300 feet outdoors, a second range of 100 feet indoors and 250 feet outdoors, and a third range of 50 feet indoors and 200 feet outdoors). As discussed above, the locating module may estimate the location as the locating agent is moving. Thus, the locating module 1550 may use a previously-determined current location value and a currently-determined current location value to rule out one or more potential values in the estimated access point data 1553. For example, using the first, second and third Wi-Fi ranges above, if a locating agent 1415 knows it has travelled more than 400 feet from a given location, and it still is able to see a given Wi-Fi access point, it may know that the third range is not appropriate for that given Wi-Fi access point and thus rule-out the third range of the estimated access point data 1553 for that access point. As these potential values are ruled out, the locating agent may transmit this information to the server 1450 for updating of the global access point database 1452, and thereby "crowd sourcing" access point information from a plurality of locating agents 1415 or calibration nodes 1417.

Thus, in operation of one or both of the data transmission manager 1508 and the locating module 1550, the locating agent 1415 identifies one or more entries in the database 1512 corresponding to the detected access points 1412(A), 1412(B), 1412(C) (or networks established thereby). If one of access points 1412(A), 1412(B), 1412(C) (or networks established thereby) do not have a corresponding entry in the database 1512, the locating agent 1415 may transmit data relevant to the missing one of the Wi-Fi networks to the server 1450 for updating of the global database 1452, according to some embodiments. In further embodiments, the locating agent 1415 adds an entry for the missing one of the access points (or networks established thereby) to the database 1512. In an embodiment, the locating agent 1415 selects one of the access points 1412(A), 1412(B), 1412(C) based at least in part on one or more of: Priority scores for the detected access points (based on such data as authorized access points 1518, verified access points 1520, and unusable access points 1522); signal strengths for the detected access points (as identified in the access point characteristic data 1552); success scores for the detected access points as identified in connection history 1526 managed by the locating agent 1415 or received from the server 1450; stored initialization data for the detected access points; passwords stored for the detected access points; categories or owners associated with the detected access points; and the like. In the illustrated example of FIG. 16, the locating agent 1415 selects the access point 1412(A) as it has the highest priority score.

Efficient Memory Management Related to Locating Agent

In embodiments, the locating agent 1415 needs to conserve memory if it is a low-powered and resource-limited device. To reduce memory requirements, the locating agent 1415 may store only portions of the global database 1452 that are needed for a given itinerary 1560 associated with the locating agent 1415. The itinerary 1560 may define a route (e.g., route 1460) that the locating agent 1415 is to travel on. For example, the locating agent 1415 may receive, via the Wi-Fi network established by an access point or via another communication protocol (e.g., cellular, Bluetooth from a gateway node, etc.), a portion of the global database 1452 corresponding to a new location (e.g., city, county, state, or country) of the locating agent 1415, an updated itinerary or trajectory for the asset, and the like.

Updating the known access points 1511 on the locating agent 1415 may be based on the locating agent 1415 being in a certain location as defined by the current location 1554 generated by locating module 1550. For example, referring to the route 1460 in FIG. 14, the locating agent 1415 may be initially provided with known access points 1511 defining access points 1412(A), 1412(B), and 1412(C). However, the locating agent 1415 may need to receive a new portion of the global database 1452 as the locating agent 1415 travels along route 1460 past the third access point 1412(C). Thus, in an embodiment, the locating agent 1415 may be triggered to receive (e.g., download) an update to the local access-point database 1512 when it determines its current location 1554 as nearby one of the access points 1412 (and/or crossing a pre-defined geofence (such as, but not limited to, location in relation to an access point, a state line, a county line, a city line, or other geofence defined in the itinerary). For example, if the second access point 1412(B) is verified, and the third access point 1412(C) is unusable (e.g., identifiable but not reliable enough to ensure download of a new data), then the trigger may indicate to download the database update in response to current location 1554 indicating the locating agent 1415 is nearby the second access database 1412(B). When an update is successfully received, the locating agent 1415 may replace or update the access-point database 1512 with the new information (e.g., a new list of known access points 1511) thereby saving memory space because the locating agent 1415 need not store known access point information for all potential access points along route 1460.

In another example, the locating agent 1415 may download instructions from the server or cloud of the wireless tracking system. Instructions may comprise, for example, an instruction to perform an action such as capturing sensor data or transmitting a notification to a device by the locating agent 1415; an instruction to enter a mode of operation (e.g., a hibernation mode, a high-frequency communication mode, a low-frequency communication mode); an instruction to transmit information to a child tape node; an instruction to initiate, turn on, or turn off a particular communications or other system of the wireless tape node; and the like. In another example, the instructions may comprise an instruction for the locating agent 1415 to upload, via the Wi-Fi network, locally stored sensor data (e.g., tracking/monitoring data 1516), a current or last-known location of the locating agent, or stored information describing events that happened to the asset. In an embodiment, the locating agent 1415 may receive location information such as geographic coordinates or GPS data via the Wi-Fi network, or may triangulate a current location based on one or more signal strengths corresponding to detected access points and determine the current location 1554 based thereon. In some embodiments, the location of an access point may be estimated based on an IP address associated with the network established by the access point.

Off-Path Locating Agent Management

As discussed above, a given locating agent 1415 may receive itinerary 1560 and associated access-point database 1512 for a tracking/monitoring application. In the example of FIG. 14, the itinerary 1560, and access-point database 1512 may include each known access point (e.g., access points 1412(A)-(C) along route 1460 or within a pre-defined area surrounding route 1460. Use of this itinerary 1560, and access-point database 1512 may be used by the locating module 1550 to identify when the locating agent 1415 is going off-course (e.g., contrary to the itinerary 1560), and generate an off-course alert 1556. In one embodiment, the locating module 1550 identifies when the locating agent 1415 is going off-course and generates off-course alert 1556 when none of the known-access points 1511 (or less than a threshold amount) are identified in the identifiable access point list 1510. In one embodiment, the locating module 1550 identifies when the locating agent 1415 is going off-course and generates off-course alert 1556 when a new access point (e.g., access point 1472) is included in the identifiable access point list 1510, but not included in the known-access points 1511.

The locating module 1550 may transmit off-course alert 1556 to an external device (e.g., server 1450 or another gateway or tape node). In an embodiment, locating module 1550 may access a high-power component of the communication device 1504 to transmit the off-course alert 1556. This may use more power, but it is important for the system to know when locating agent 1415 is off-course. Locating module 1550, however, still advantageously saves power because it enables off-course identification at the locating agent 1415, instead of locating agent 1415 having to continuously or periodically transmit its location to an external device. After transmission of off-course alert 1556, the locating agent 1415 may receive an update to access-point database 1512 and/or itinerary 1560 as discussed above. In another embodiment, the server 1450 may compare the newly identified access point (e.g., access point 1472), identified within the off-course alert 1556, to a public database to identify the location thereof and verify whether it is proximate the route 1460, but just not previously known. In such situations where the newly identified access point (e.g., access point 1472) is on the route 1460 (or within the pre-defined area surrounding the route 1460), the locating agent 1415 may receive an ignore signal that indicates the off-course alert 1556 was a false alarm.

Access-Point Database Management

As discussed above, the server 1450 may maintain a global database 1452 of known access points, and their associated information such as location, SSID, encryption requirements, etc. This global database 1452 may comprise publicly available information, as well as populated information received from one or more agents (e.g., locating agent 1415) that have previously identified a given access point.

Moreover, in at least one embodiment, the global database 1452 is updated using a calibration node 1417. In some embodiments, calibration node 1417 is any of wireless tape nodes as described in conjunction with FIGS. 1-13, above, or are embodiments of locating agent 1415 and have one or more location sensors or communications systems capable of determining location data, e.g., GPS sensors, satellite communications systems. In some embodiments, calibration node 1417 may be other types of nodes, e.g., gateway nodes.

The calibration node 1417 is shown located on the vehicle, however it may be located on a package in-route, in the vehicle as opposed to the trailer, or elsewhere. The calibration node 1417 of the wireless tracking system initiates network capabilities (e.g., Wi-Fi capabilities, enabling the wireless tape node to establish a communications connection to potential access points. In some embodiments, the calibration node 1417 may be associated with an asset that the calibration node 1417 is tracking (e.g., the locating agent 1415). In other embodiments, the calibration node 1417 is transported for the purpose of gathering data and is not associated with an asset. In other embodiments, the calibration node 1417 is a gateway device located on a transportation vehicle (e.g., vehicle 1420) that is transporting assets 1405 that are being monitored by one or more locating agents 1415. In an embodiment, the calibration node 1417 is a duplicate device to the locating agent 1415 located on a package. For example, a shipper may be instructed to place two locating agents 1415 on a given asset 1405, where one is a calibration node 1417 dedicated to populating the global database 1452 as discussed below, and another is a locating agent 1415 dedicated to monitoring the asset 1405.

The calibration node 1417 identifies one or more access points (e.g., access points 1412) via a signal broadcast thereby. For example, where access points 1412 are Wi-Fi access points, each is associated with an SSID broadcast thereby. In some embodiments, the access point may include additional or alternative information from an SSID in a signal broadcast thereby, such as but not limited to one or more of: a password, a network name, initialization data, an owner, GPS coordinates, signal strength, and the like. The calibration node 1417 (or a locating agent 1415 implementing functionality of a calibration node 1417 as discussed herein) establishes, or attempts to establish, a communication connection with an access point and captures location data by one or more location sensors or systems associated with the calibration node 1417. In one embodiment, the calibration node 1417 includes a data transmission manager (such as data transmission manager 1508) that, in addition to or alternatively from the above-discussed functionality of data transmission manager 1508, includes a guessing algorithm 1580. Guessing algorithm 1580 may, in response to identification of an access point (e.g., one of access points 1513 in identifiable access points list 1510) that is not known or authorized, be run to attempt a connection to the access point. For example, if the unknown access point is associated with a coffee shop, the guessing algorithm may guess "Coffee2021!" or some variant thereof. The guessing algorithm 1580 may be based on common patterns for connection information (i.e., common sign-on credentials for similar SSID names, common walkthrough consent forms, auto population of connection forms, etc.). If a connection is successful via the guessing algorithm 1580, the access point may be indicated as a verified access point 1520.

The calibration node 1417 may also verify the data within the global database 1452. For example, the calibration node 1417 establishes a satellite communication to receive GPS coordinates corresponding to a current location of the calibration node 1417, or captures location data by another location sensor (such as receiving location from an external device located on vehicle 1420). The calibration node 1417 additionally captures information about the connection or attempted connection to the access point, e.g., whether the attempt was successful, security protocols associated with the access point, an amount of time required to establish the connection, whether the access point required a password, and the like. In some embodiments, the calibration node 1417 does not connect to the network established by the access point, but still collects location data that is associated with the access point.

As each calibration node 1417 collects data, the calibration node 1417 may continuously or periodically transmit the data captured thereby (such as connection history 1526) to external server 1450 for updating of global database 1452. Thus, the global database 1452 is ad-hoc updated as various calibration nodes 1417 (or locating agents 1415 implementing the functionality thereof) travel. Accordingly, the global database 1452 is built up as a database comprising a plurality of entries, each entry comprising information describing a respective access point (e.g., a Wi-Fi network access point). For example, the entries comprise comprising information including one or more of: a name of each network established by each access point, a password of the each access point, location data of each access point; a priority score for each access point relative to other access points; a success score corresponding to a number of successful attempts to connect to each access point by other nodes (e.g., locating agents 1415 and/or calibration nodes 1417) in the wireless tracking system; a category or owner (or service) of the access point, a success rate or probability for nodes of the wireless tracking system attempting to access the network established by each access point, a login time (e.g., the most recent time a wireless tape node successfully connected to the network established by each access point) of the network, initialization data for the network established by each access point, previously recorded received signal strength (e.g., RSSI) values, peak received signal strength values, known wireless connection range for the access point, prior recorded upload/download speeds associated with the network established by the access point, a model of a device corresponding to the access point, a MAC address associated with the access point, and a priority score for the network, geographic location. Thus, the entries in global database 1452 may be populated by previous journeys by calibration nodes or other locating agents, as described above, of the wireless tracking system, or may be populated by one or more third-party databases describing various access points.

In some embodiments, the calibration node accesses the database 1452 or 1512 to determine information for establishing a connection (e.g., via known access points data 1511), such as, to retrieve a password for an identifiable access point. In other embodiments, the calibration node accesses the database responsive to a communication connection being established or having failed and populates an entry in connection history data 1526 The calibration node may identify an existing entry in the database corresponding to the Wi-Fi network and add, modify, or delete information associated with the entry, or may add a new entry to the database corresponding to the Wi-Fi network and populate information based on the attempted communication connection (either directly, or via transmission of the connection history associated therewith to an external device, such as server 1450). For example, the calibration node may search the database for an SSID corresponding to the detected Wi-Fi network and update one or more fields of an entry having the SSID, e.g., to reflect a changed password for the Wi-Fi network, to update a success score based on a result of the attempted connection, to update initialization data associated with the Wi-Fi network, and the like. In another example, the calibration node may add a new entry to the database identifying the Wi-Fi network based on an SSID and incorporating information captured by the calibration node during the attempted connection, e.g., a success score, one or more security protocols and/or a corresponding priority score, a name of the Wi-Fi network, a category or owner of the Wi-Fi network, GPS or other location data captured by the calibration node during the attempted connection, and the like.

The above-discussed information associated with calibration node 1417 (or other locating agents 1415) that is transmitted to server 1450 may be used to generate the global access-point database 1452 or known-access point database 1511, such as defining a given access point within any one or more of the authorize access point list 1518, private access point list 1519, verified access point list 1520, white-list 1521, unusable access-point list 1522, and black-list 1523.

Integrated Access Point Management

Figure 17:
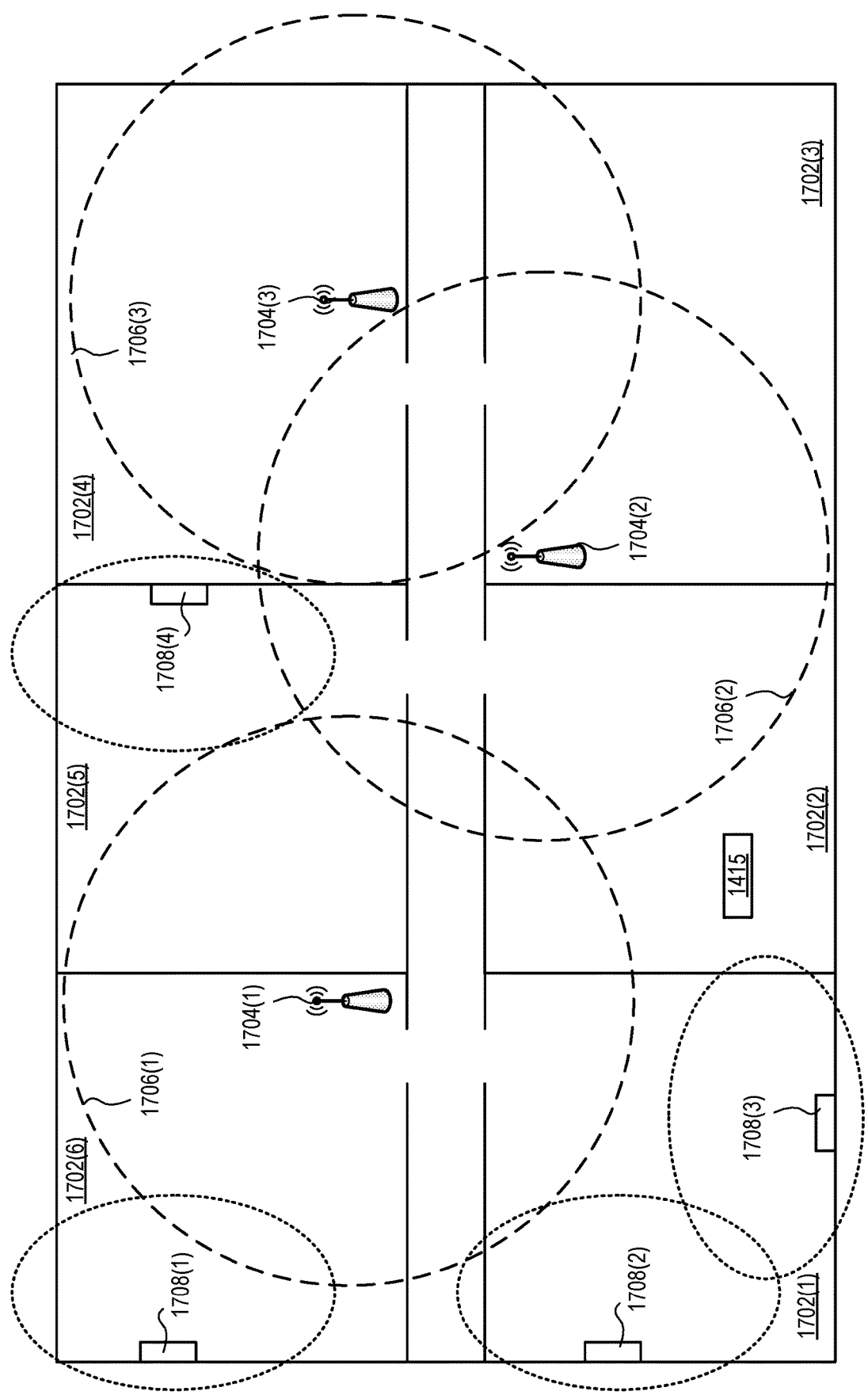
FIG. 17 shows an example building network overlay for a building having 6 rooms, in embodiments.

Embodiments of the present application also realize that in-building access point management is difficult because, although a given access point may be intended to cover a certain area, the actual network reliability and coverage area serviced may not be to spec. For example, FIG. 17 shows an example building network overlay 1700 for a building having 6 rooms 1702(1)-(6). Three access points 1704(1)-(3) are included, however their respective coverage areas 1706(1)-(3) does not cover the entire footprint of the building. Simply adding additional Wi-Fi access points may not be desirable, as in certain instances, too many Wi-Fi access points may create thrash and bleeding without providing additional resolution.

The above-discussed data transmission manager module 1508 and/or locating module 1550 may be utilized to improve wireless coverage in a given area (e.g., in a building such as in FIG. 17). Thus, the present embodiments disclose establishing a mesh network by taking the existing access points (e.g., access points 1704) in a building or area and then adding, as required, infrastructure nodes 1708, to supplement the existing access points 1704 in the building or area to achieve adequate or full coverage of the building or area for tracking assets. The infrastructure nodes 1708 may include gateways, tape nodes, or other agents/nodes as discussed herein. The existing access points 1704 may be a first communication protocol, and the infrastructure nodes 1708 may be a second communication protocol, different from the first. For example, the first communication protocol may be a Wi-Fi-based communication protocol, and the second communication protocol may be a Bluetooth-based communication protocol. Thus, the second communication protocol may have a smaller range than the first communication protocol. Use of gateways or tape nodes as described above, and in combination with a different second communication protocol than the first communication protocol, provides easier installation of a mesh network for use by the locating agent than adding additional existing access points (e.g., more Wi-Fi access points).

In the example of FIG. 17, a locating agent 1415, or plurality thereof may continuously or periodically identify identified access points (e.g., access points 1513 in the identifiable access point list 1510) while it is in the building, and store the connection history thereof. In embodiments of locating agent 1415 used for access point management, the locating agent 1415 may include a network manager 1570. The network manager module 1570 may also be located on an external device (e.g., server 704 of FIG. 7), and the data needed to implement the functionality of the network manager 1570 is transmitted from the locating agent 1415 to the external device for analysis thereof.

The network manager module 157 may be able to confirm the locating agent 1415 is within a building if it has not received an out-of-area trigger 1572. The out-of-area trigger 1572 may be received by the locating agent 1415 in response to the locating agent 1415 passing a gateway node or tape node (e.g., as described above with respect to system 700) located at each exit point of the building. While the locating agent 1415 is in the building, the access points 1513 in the identifiable access point list 1510 may be periodically or continuously monitored, and the connection history 1526 associated therewith may be used to identify when connections are not available and generate a no-connection list 1573. The no-connection list 1573 may be correlated with the current location 1554 to identify the location of the locating agent 1415 at the time of a given no-connection status thus equating to a network void spot 1574 within the building. This correlation may then be used to identify where to place additional infrastructure nodes 1708.

Moreover, the added infrastructure nodes 1708 may then be updated in the known access points data 1511, discussed above. Thus, as a given asset that is tracked via locating agent 1415 (or another locating agent receiving the known access points data 1511) is moving within the building, use of the known access points data 1511, including both the existing access points 1704 and the infrastructure nodes 1708 may be used for locating and data connection management, such as via implementation of one or both of the data transmission manager 1508 and the locating module 1550 discussed above.

In particular, inclusion of infrastructure nodes 1708 may provide more precise locating of the locating agent 1415 within a building environment. For example, where the existing access points 1704 are Wi-Fi based, locating using Wi-Fi real-time location sensing (RTLS) is based off of triangulation, which may be less precise. However, inclusion of infrastructure nodes 1708 that have their precise location predetermined and stored in the tracking system (e.g., within known-access data 1511), allows for more precise locationing Wireless communications between a locating agent 1415 on an asset and an infrastructure node 1708 allows the tracking system to determine the location of the locating agent 1415 on the asset as being within a threshold distance from the infrastructure node's 1708 known location.

In an embodiment, the existing access points 1704 are operated via a first service, and the infrastructure nodes 1708 are operated via a second service. The locating agent 1415 may be required to be associated with the second service, such as registered thereto either on initiation of the locating agent 1415, or via a back-end registration process (that is different than simply a network ID/password sign-on registration). For example, wireless tape nodes in FIG. 8 may be registered to the server 704 associated with wireless tracking system 800. Thus, the infrastructure nodes 1708 may collectively implement a private network dedicated to the locating agent 1415 (and other devices of the wireless tracking system such as those shown in FIG. 8). Use of a second service, different from the first service, enables the benefit of reduced impact on the network established by one or more of the existing access points 1704. For example, by creating a "client-member" or "private" network for second service that is dedicated to functionality of locating agent 1415, the normal operation of Wi-Fi enabled, in one example of FIG. 17, by existing access point 1704 is reduced.

Figure 18:
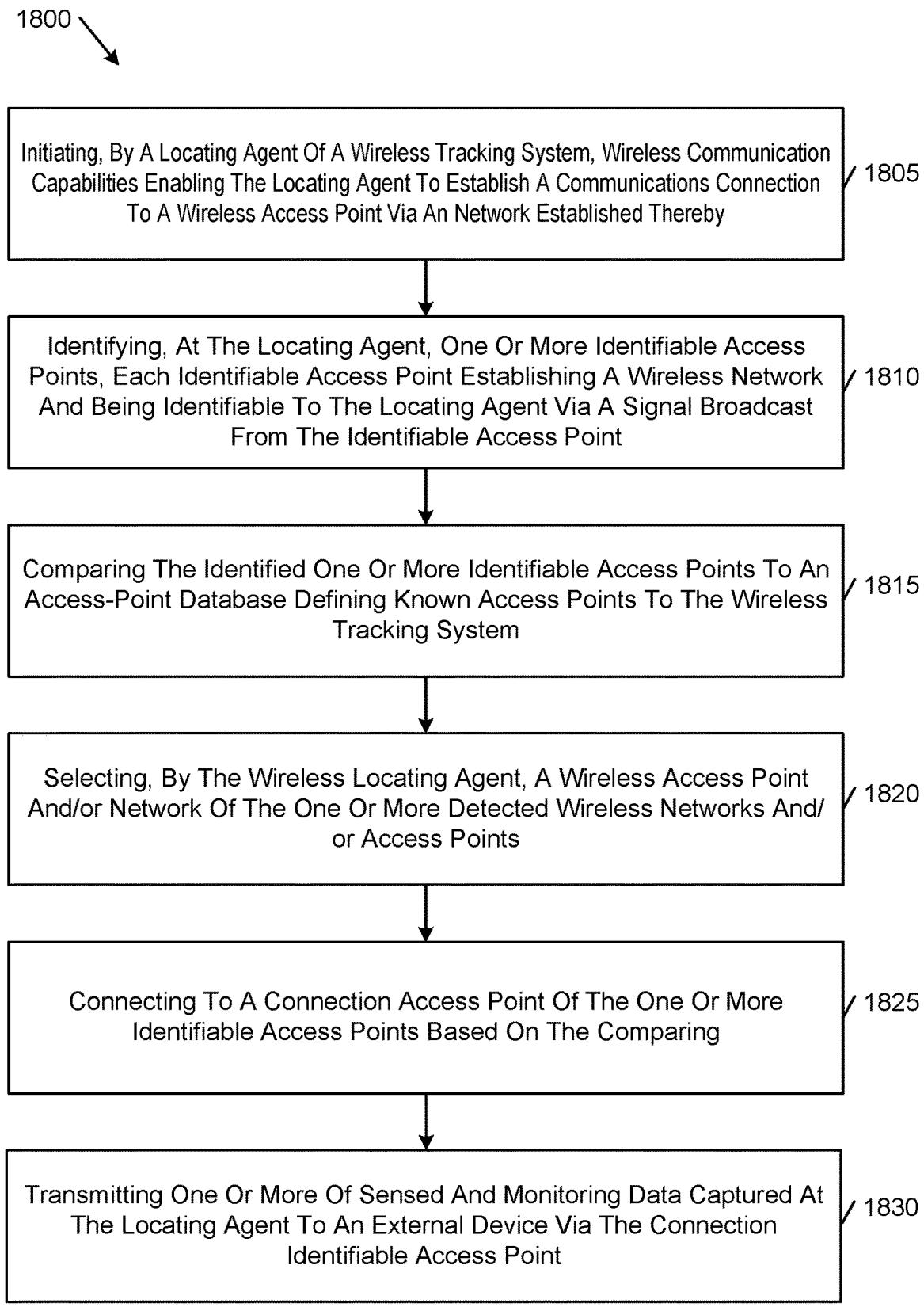
FIG. 18 is a flow diagram of a method for identifying an access point for connection by a locating agent of a wireless tracking system, in embodiments.

FIG. 18 is a flow diagram of a method 1800 for identifying an access point for connection by a locating agent of a wireless tracking system, in embodiments. The method of FIG. 18 may be implemented using locating agent 1415, calibration node 1417, and one or more of the data transmission manager 1508, locating module 1550 and network manager 1570 discussed therewith.

In block 1805, method 1800 includes initiating, by a wireless locating agent of a wireless tracking system, wireless communication capabilities enabling the wireless locating agent to establish a communications connection to a wireless network established by an access point. For example, a wireless tape node (e.g., locating agent 1415) of a wireless tracking system initiates Wi-Fi capabilities (e.g., activates communication device 1504), enabling the wireless tape node to establish a communications connection to a Wi-Fi network established by an access point (e.g., one or more of access points 1412, 1704, 1708). In one example of method 1800, a wireless tape node is associated with an asset that the wireless tape node is tracking. For example, the wireless tape node may be adhered to the asset to track the location of the asset during a delivery of the asset. The initiating may be performed responsive to an event, such as crossing a geofence or detecting a loading or unloading event, or may be performed at a time interval, according to some embodiments. Although the above example refers to initiating Wi-Fi connections for locating and data transfer, it should be appreciated that other communication protocols other than Wi-Fi may be initiated as well, without departing from the scope hereof.

In block 1810, the method identifies, at the locating agent, one or more identifiable access points, each identifiable access point establishing a wireless network and being identifiable to the locating agent via a signal broadcast from the identifiable access point. In an example, a wireless locating agent detects one or more access points establishing Wi-Fi networks. Each Wi-Fi network and/or access point establishing said network, may be associated with an SSID and a password. Additionally, each access point and/or network established thereby may be associated with, for example, a network name, initialization data, an owner, GPS coordinates, signal strength, and the like.

In block 1815, the method 1800 compares the identified one or more identifiable access points to an access-point database defining known access points to the wireless tracking system. In one example of block 1815, the wireless locating agent 1415 accesses a database (e.g., access point database 1512) comprising a plurality of entries. Each entry comprises information including at least an SSID and a password corresponding to a Wi-Fi network and access point. Each entry may additionally include information including one or more of: a name of the wireless communication network; location data of the wireless communication network; a priority score for the wireless communication network relative to other wireless communication networks; a success score corresponding to a number of successful attempts to connect to the wireless communication network by other nodes in the wireless tracking system; a category or owner of the wireless communication network; and stored initialization information for the wireless communication network. As described previously, the entries in database 1512 may be from a global access point database 1452 and populated therein by third-party databases describing wireless communication networks or may be populated by calibration tape nodes (e.g., calibration node 1417) or other locating agents having previously connected to the wireless communication networks and having GPS or other sensors to record location data. Thus, at each locating agent implementing block 1815, each wireless communication network and associated access point may be defined by known access point data 1511, as discussed above).

In block 1820, method 1800 selects, by the wireless locating agent, a wireless access point and/or network of the one or more detected wireless networks and/or access points. In one example of block 1820, locating agent 1415 generates connection access-point list 1514 as discussed above, and selects an access-point defined therein for connection. Said selection may be based on a priority ranking as defined within the connection access-point list 1514. Thus, in block 1820, the wireless locating agent may perform the selection based at least in part on identification of a connection access-point list (e.g., connection access-point list 1514) which may be based on: Signal strength of the detected Wi-Fi networks; priority scores corresponding to the detected Wi-Fi networks; success scores corresponding to the detected Wi-Fi networks; stored initialization data corresponding to the detected Wi-Fi networks; owners or categories of the detected Wi-Fi networks; and the like. For example, a wireless locating agent may perform the selection based on relative success scores of the detected Wi-Fi networks if the wireless locating agent has a low battery level, so as to reduce the likelihood of expending battery life on multiple connection attempts. In another example, the wireless locating agent may perform the selection based on stored initialization data to reduce an amount of time required to establish the connection. In another embodiment, the wireless locating agent may be configured to prioritize public or global access networks, e.g., Wi-Fi networks owned by known entities such as retail or storage locations that are in known access point list 1511. In another embodiment, the wireless locating agent may be configured to prioritize authorized access points, such as those listed in authorized access point list 1518. In another embodiment, the wireless locating agent may be configured to prioritize verified access points, such as those listed in verified access point list 1520. In another embodiment, the wireless locating agent may be configured to deprioritize unusable access points, such as those listed in unusable access point list 1522.

In block 1825, method 1800 connects to a connection access point of the one or more identifiable access points based on the comparing. For example, locating agent 1415 may connect, using communication device 1504 to the access point having highest priority in connection access-point list 1514.

In some embodiments, if none of the one or more detected wireless access points and/or networks has a corresponding entry in the plurality of entries in known access-point database 1511, the wireless locating agent disables wireless communication capabilities for a period of time. For example, in embodiments where the wireless locating agent searches for known wireless communication networks at regular time intervals, the wireless locating agent may disable wireless communication capabilities for a next time interval. In another example, in embodiments where the wireless locating agent searches for wireless communication networks responsive to detecting an event (e.g., passing a geo-fence, detecting unloading or loading, or the like), the wireless locating agent disables wireless communication capabilities until a next detected event. In other examples, the wireless locating agent may disable wireless communication capabilities for a set period of time, e.g., five minutes, an hour, after which it enables wireless communication capabilities again. In some embodiments, if none of the one or more detected communication capabilities networks has a corresponding entry in the plurality of entries, the wireless locating agent disables communication capabilities and enables another communications system, e.g., Bluetooth, satellite, cellular, or other communications systems.

In some embodiments, if none of the one or more detected wireless communication networks has a corresponding entry in the plurality of entries, the wireless locating agent establishes a communication connection between the wireless locating agent and an unknown identified wireless communication network and attempts to communicate via the unknown wireless communication network. The wireless locating agent may perform one or more analyses to determine security of the connection with the wireless communication network prior to transmitting information via the wireless communication connection. For example, the wireless tape node may determine a type of wireless communication security protocol used by the wireless communication network.

In block 1830, once a communication link is established, the locating agent transmits one or more of sensed and monitoring data captured at the locating agent to an external device via the connection identifiable access point selected from the connection access-point list. For example, locating agent 1415 transmits tracking/monitoring data 1516 to the connection identifiable access point having highest priority in the connection access-point list 1514 to another device such as a server (e.g. server 704, 1450) or another locating agent, a gateway node, or other device.

In some embodiments, the steps described in conjunction with FIG. 18 are performed by the wireless tape node of the wireless tracking system. In other embodiments, one or more steps may be performed by another entity, and the method may comprise additional, fewer, or different steps than those described in FIG. 18.

Figure 19:
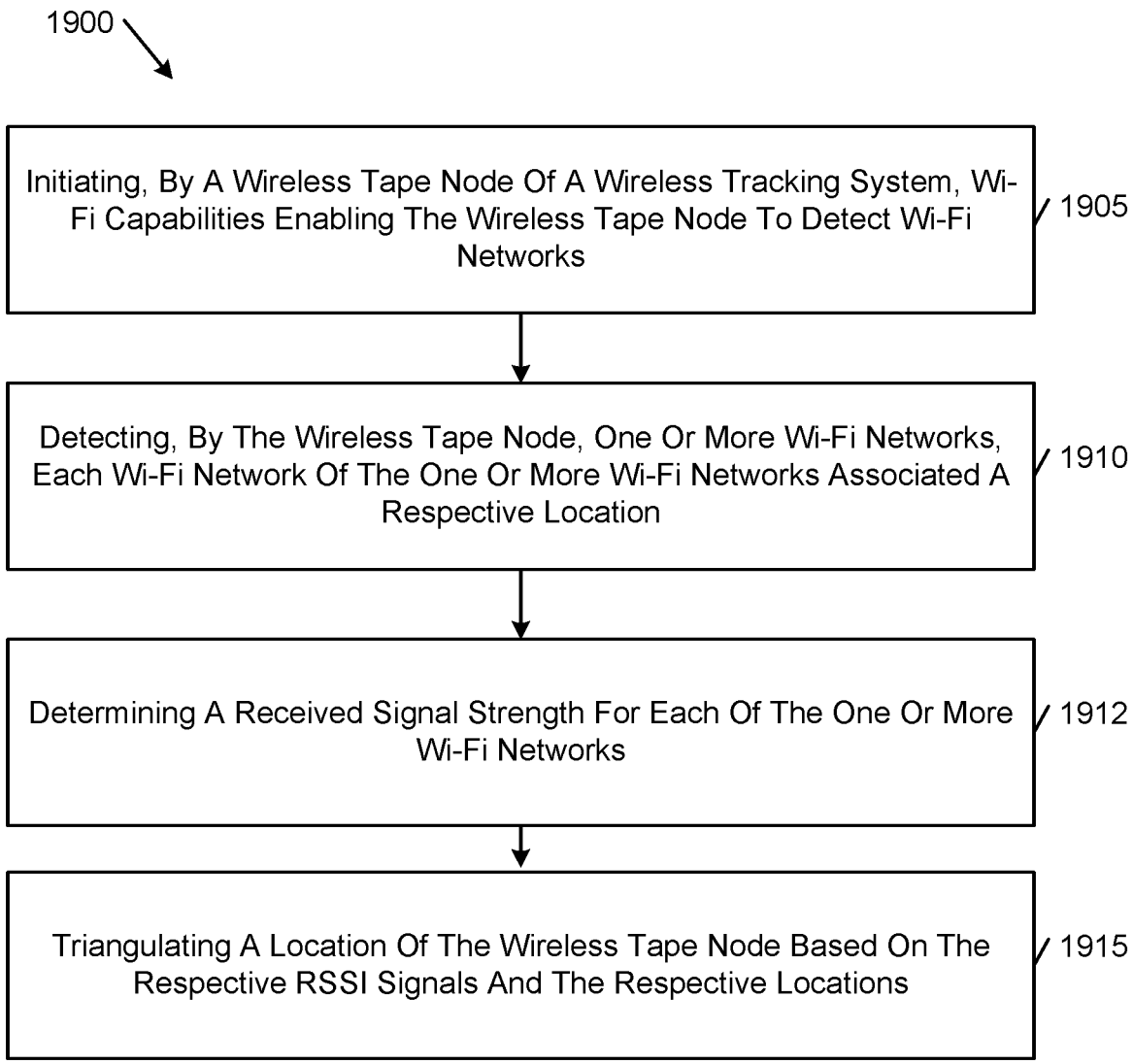
FIG. 19 is a flow diagram of a method for determining locations of wireless tape nodes based on signal strengths of wireless communication access points and/or networks established thereby, in accordance with an embodiment.

FIG. 19 is a flow diagram of a method 1900 for determining locations of wireless tape nodes based on signal strengths of wireless access points and/or networks established thereby, in accordance with an embodiment. Method 1900 may be performed using locating module 1550, to generate current location 1554, for example. A wireless tape node (e.g., locating agent 1415) of a wireless tracking system Wi-Fi capabilities, enabling the wireless tape node to detect Wi-Fi networks within an area (FIG. 19, block 1905). As described in conjunction with FIG. 18, the wireless tape node is associated with an asset that the wireless tape node is tracking, in some embodiments. For example, the wireless tape node may be adhered to the asset to track the location of the asset during a delivery of the asset. The initiating may be performed responsive to an event, such as crossing a geofence or detecting a loading or unloading event, or may be performed at a time interval, according to some embodiments.

The wireless tape node detects one or more access points (e.g., access points 1412) establishing Wi-Fi networks (FIG. 19, block 1910). Each access point 1412 may be associated with a respective known location (e.g., as defined in known access point data 1511). Additionally, each Wi-Fi network may be associated with one or more of an SSID or other identifier, a password, a network name, initialization data, an owner, and the like. In some embodiments, the wireless tape node may additionally access a database (e.g., global database 1452) comprising a plurality of entries describing known Wi-Fi networks, as described in conjunction with FIGS. 12-14. The database may include location data, e.g., GPS coordinates, of one or more of the detected Wi-Fi access points and/or networks established thereby.

For each of the one or more Wi-Fi networks, a received signal strength is determined (FIG. 19, block 1912). The received signal strength may be of a signal broadcast by the access point including the SSID of the access point. The received signal strength may correspond to a distance from the access point (e.g., access point 1412). The received signal strength may be an RSSI value, in some embodiments. In other embodiments, a different measure of received signal strength than RSSI may be used.

The wireless tape node triangulates a current location based on the respective RSSI signals and respective locations of the detected Wi-Fi access points. In embodiments wherein the wireless tape node detects three or more Wi-Fi networks and receives respective RSSI signals and locations for the Wi-Fi networks, the wireless tape node performs a triangulation computation to determine a current location (e.g., current location 1554) for the tape node and the corresponding asset. In some embodiments wherein the wireless tape node detects less than three Wi-Fi networks, the wireless tape node may perform a triangulation computation to determine an approximate current location (e.g., a circular region, line, or other region representing possible current locations of the wireless tape node). In other embodiments wherein the wireless tape node detects less than three Wi-Fi networks, the wireless tape node may disable Wi-Fi capabilities for a period of time, e.g., as described in conjunction with FIG. 18. Using the method shown in FIG. 19, the estimated location of the wireless tape node may be determined simply based on broadcasted signals (e.g., SSID broadcast) from the one or more Wi-Fi networks, without connecting to the Wi-Fi networks established by the access points, according to some embodiments.

In some embodiments, the steps described in conjunction with FIG. 19 are performed by the wireless tape node of the wireless tracking system. In other embodiments, one or more steps may be performed by another entity, and the method may comprise additional, fewer, or different steps than those described in FIG. 19.

Figure 20:
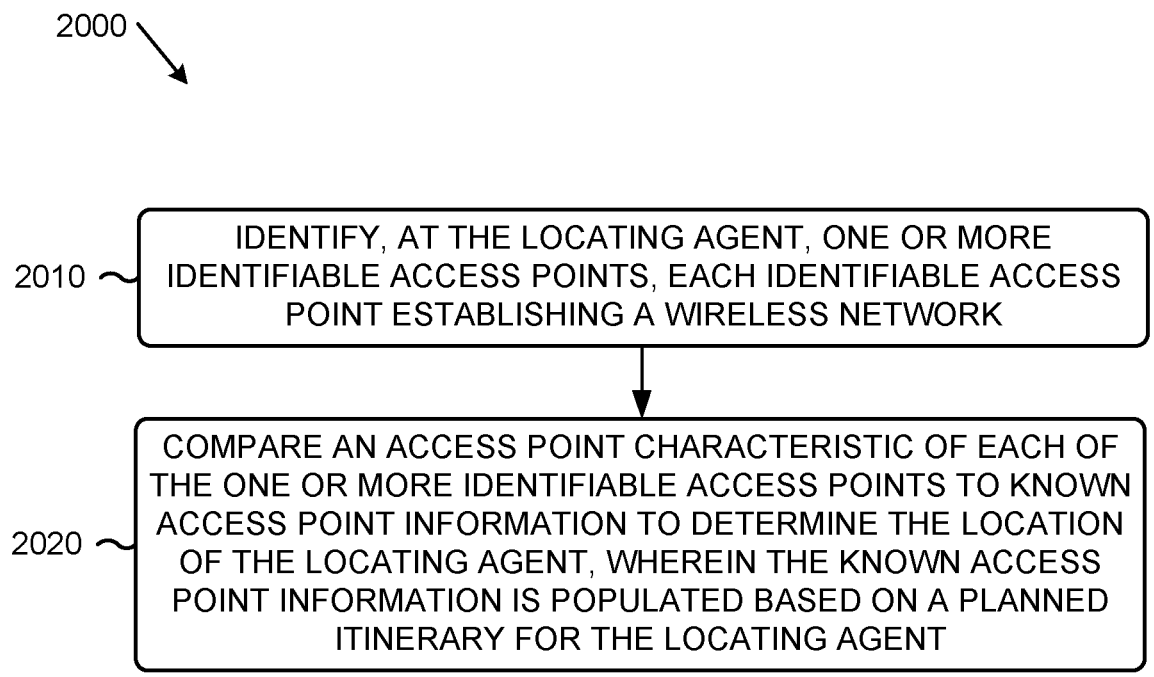
FIG. 20 is a flowchart of an example process or determining location of a locating agent of a wireless tracking system.

FIG. 20 is a flowchart of an example process 2000 or determining location of a locating agent of a wireless tracking system. In some implementations, one or more process blocks of FIG. 20 may be performed by a locating agent (e.g., locating agent 1415). In some implementations, one or more process blocks of FIG. 20 may be performed by another device or a group of devices separate from or including the locating agent 1415, such as a gateway node, other locating agent, or any nodes discussed in FIG. 7.

As shown in FIG. 20, process 2000 may include identifying, at the locating agent, one or more identifiable access points, each identifiable access point establishing a wireless network (block 2010). For example, the locating agent 1415 may identify, one or more identifiable access points (e.g., access points 1412), each identifiable access point establishing a wireless network, as described above.

As further shown in FIG. 20, process 2000 may include comparing an access point characteristic of each of the one or more identifiable access points to known access point information to determine the location of the locating agent, wherein the known access point information is populated based on a planned itinerary for the locating agent (block 2020). For example, the locating agent 1415 may compare an access point characteristic 1552 of each of the one or more access points 1513 in the identifiable access point list 1510 to known access point information 1511 to determine the location 1554 of the locating agent 1415, wherein the known access point information is populated based on a planned itinerary 1560 for the locating agent, as described above.

Process 2000 may include additional implementations, such as any single implementation or any combination of implementations described below and/or in connection with one or more other processes described elsewhere herein.

Process 2000 may further include, when the location indicates the locating agent has passed a geofence, transmitting an alert to an external device. For example, when the current location 1554 indicates the locating agent 1415 has passed a geofence as defined by itinerary 1560, locating agent 1415 may generate alert 1556 as discussed above. The geofence may be defined by, but is not limited to, location in relation to an access point, a state line, a county line, a city line, or other geofence defined in the itinerary. In a first implementation, process 2000 includes comparing the identifiable access points to a known access point list corresponding to the planned itinerary, and when the identifiable access points do not correspond to the known access point list, transmitting an off-course alert. For example, the identifiable access points do not correspond to the known access point list when no known access points in the known access point list match the identifiable access points. As another example, the identifiable access points do not correspond to the known access point list when less than a threshold number of known access points in the known access point list match the identifiable access points.

Process 2000 may further include after transmitting an alert to the external device, receiving an update to the known access point information, the update including additional known access points based on the geofence passed. For example, as the locating agent 1415 moves, if the geofence passed indicates that the locating agent 1415 is going beyond the current information available in known access point list 1511, the locating agent 1415 may receive additional information from the global access point database 1452 from server 1450 so that the locating agent 1415 can understand its location, based on nearby access points, in relation to a new area that it is traveling in.

In a second implementation, alone or in combination with the first implementation, transmitting an off-track alert includes activating a cellular communication device to transmit the off-course alert.

Although FIG. 20 shows example blocks of process 2000, in some implementations, process 2000 may include additional blocks, fewer blocks, different blocks, or differently arranged blocks than those depicted in FIG. 20. Additionally, or alternatively, two or more of the blocks of process 2000 may be performed in parallel.

Figure 21:
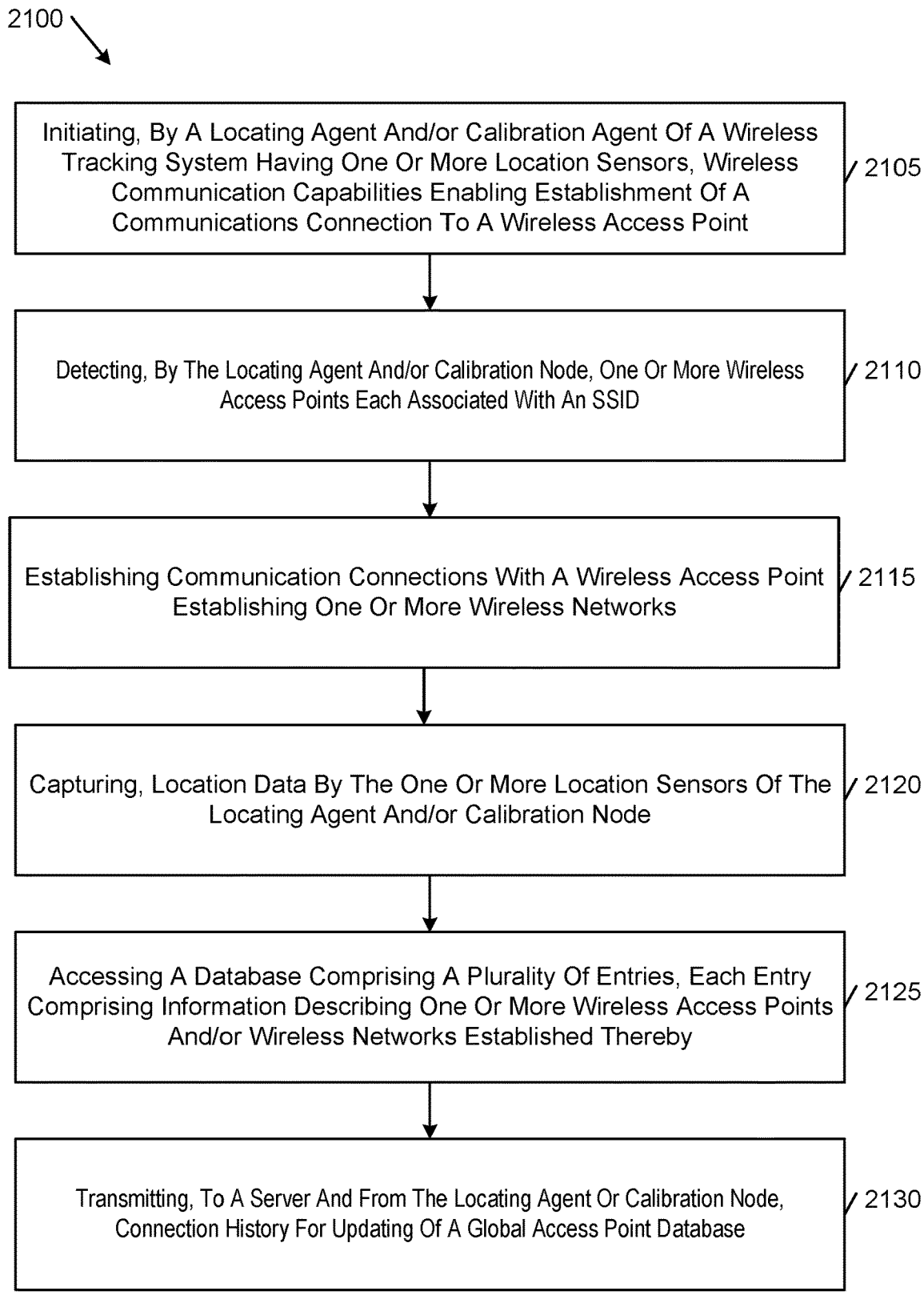
FIG. 21 is a flow diagram of a method for populating a database describing known access points, in accordance with an embodiment.

FIG. 21 is a flow diagram of a method 2100 for populating a database describing known access points, in accordance with an embodiment. Method 2100 may be implemented by server 1450, locating agent 1415, and/or calibration nodes 1417 and one or more of the data transmission manager 1508, locating module 1559, and network manager 1570. In some embodiments, calibration nodes 1417 are wireless tape nodes as described in conjunction with FIGS. 2-6C having one or more location sensors or communications systems capable of determining location data, e.g., GPS sensors, satellite communications systems. In some embodiments, calibration nodes 1417 may be other types of nodes, e.g., gateway nodes as described above, such as a gateway node applied to a shipping vehicle.

A locating agent (e.g., agent 1415, 1417) of a wireless tracking system initiates wireless communication capabilities, enabling the locating agent to establish a communications connection to a wireless access point (e.g., a Wi-Fi access point establishing a Wi-Fi network) (FIG. 21, block 2105). In some embodiments as discussed in conjunction with FIG. 18, the locating agent and/or calibration node may be associated with an asset that the locating agent and/or calibration node is tracking. In other embodiments, the calibration node is transported for the purpose of gathering data and is not associated with an asset, or is associated (e.g., adhered to) an asset but redundant to another locating agent that is monitoring the asset. As such, the locating agent and/or calibration node may initiate wireless communication capabilities, responsive to detecting an event or geo-fence, may initiate wireless communication capabilities at regular intervals (e.g., once an hour, once every ten minutes, etc.), or may initiate wireless communication capabilities at the start of a journey and maintain wireless communication capabilities throughout the journey.

The locating agent and/or calibration node detects one or more access points establishing a wireless network (FIG. 21, block 2110). Each wireless access point (e.g., access point 1412) of the one may be associated with an SSID. In some embodiments, each wireless access point, or wireless network established thereby, may additionally be associated with one or more of: a password, a network name, initialization data, an owner, GPS coordinates, signal strength, and the like. The locating agent and/or calibration node establishes, or attempts to establish, a communication connection with an access point establishing a wireless network (FIG. 21, block 2115). In an embodiment, the locating agent and/or calibration node also captures location data by one or more location sensors or systems associated with the calibration node (FIG. 21, block 2120). For example, the locating agent and/or calibration node establishes a satellite communication to receive GPS coordinates corresponding to a current location of the tape node, or captures location data by another location sensor. The calibration node additionally captures information about the connection or attempted connection to the wireless access point, e.g., whether the attempt was successful, security protocols associated with the Wi-Fi network, an amount of time required to establish the connection, whether the Wi-Fi network required a password, and the like, and stores such information as connection history (e.g., connection history 1526). In some embodiments, the locating agent and/or calibration node does not connect to the wireless access point, but still collects location data that is associated with the wireless access point.

The locating agent and/or calibration node accesses a database (e.g., global database 1452) comprising a plurality of entries, each entry comprising information describing a respective access point and/or wireless network established thereby (FIG. 21, block 2125). For example, the entries comprise comprising information including one or more of: a name of the wireless network, a password of the wireless network, location data of the wireless network; a priority score for the wireless network relative to other wireless networks; a success score corresponding to a number of successful attempts to connect to the wireless network by other nodes in the wireless tracking system; a category or owner of the wireless network; and stored initialization information for the wireless network. The entries may be populated by previous journeys by locating agent and/or calibration nodes of the wireless tracking system, or may be populated by one or more third-party databases describing public wireless networks.

In some embodiments, the locating agent and/or calibration node accesses the database 1452 (e.g., receives all or a portion of global access point database 1452) to determine information (e.g., known access point data 1511) for establishing a connection, e.g., to retrieve a password for a detected wireless access point. In other embodiments, the locating agent and/or calibration node transmits its connection history (e.g., connection history 1526) to a server (e.g., server 1450) for updating of the access point database. (FIG. 21, block 2130). Information (e.g., connection history 1526) received at the server from the locating agent and/or calibration node may then be used to add, modify, or delete information within the global access point database. For example, the server 1450 may add a new entry to the database corresponding to a Wi-Fi network and populate information based on the attempted communication connection. As another example, the locating agent and/or calibration node may receive known access point data 1511 and identify an SSID corresponding to a detected access point and/or network established thereby. The calibration node may update one or more fields of an entry having the SSID, e.g., to reflect a changed password for the associated network, to update a success score based on a result of the attempted connection, to update initialization data associated with the associated network, and the like. In another example, the locating agent and/or calibration node may add a new entry to its local database (e.g., database 1512) identifying the wireless access point and/or associated wireless network based on an SSID and incorporating information captured by the calibration node during the attempted connection, e.g., a success score, one or more security protocols and/or a corresponding priority score, a name of the wireless network, a category or owner of the wireless network, GPS or other location data captured by the calibration node during the attempted connection, and the like.

In some embodiments, the steps described in conjunction with FIG. 21 are performed by the wireless tape node of the wireless tracking system. In other embodiments, one or more steps may be performed by another entity, and the method may comprise additional, fewer, or different steps than those described in FIG. 21.

Figure 22:
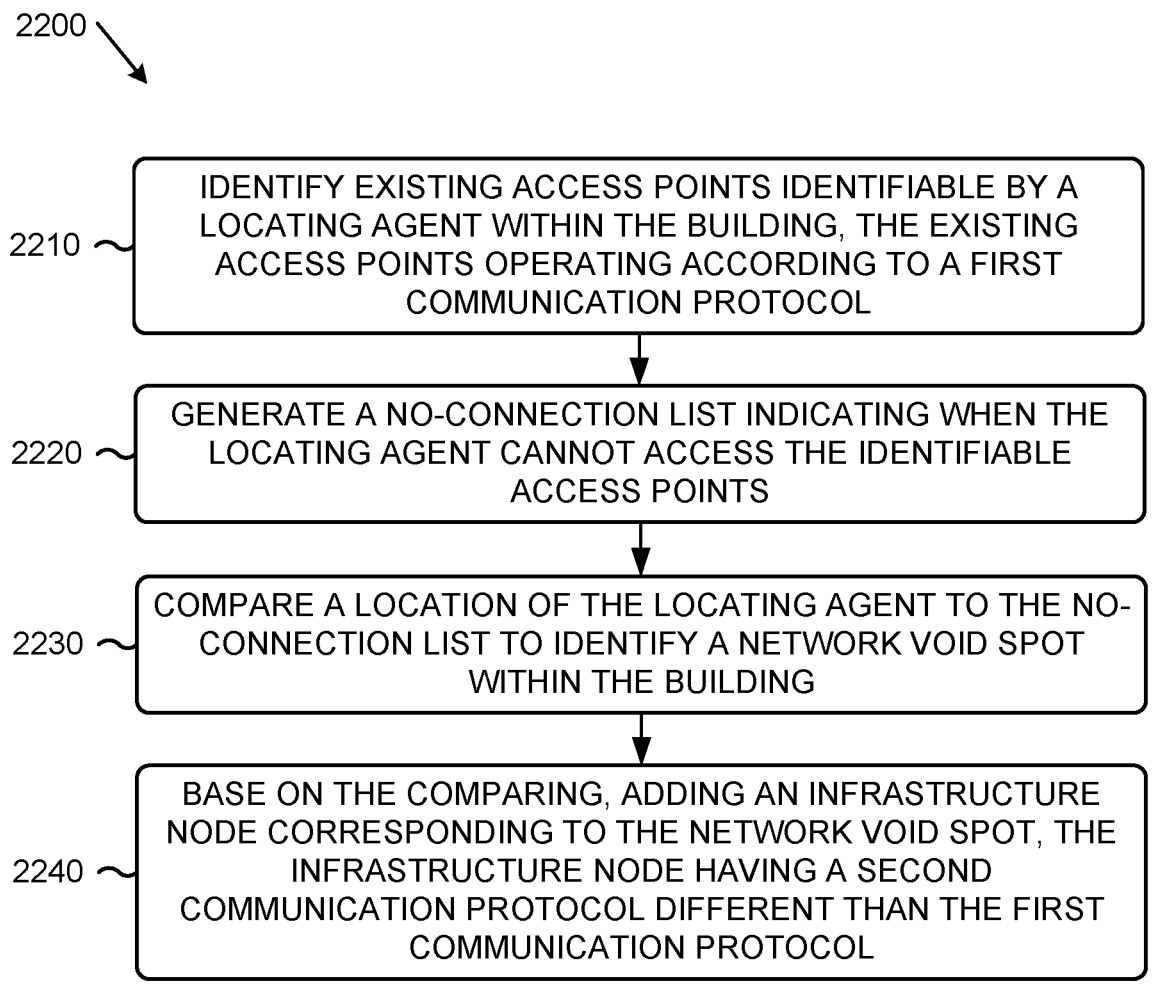
FIG. 22 is a flowchart of an example process for configuring a mesh network within a building.

FIG. 22 is a flowchart of an example process 2200 for configuring a mesh network within a building. In some implementations, one or more process blocks of FIG. 22 may be performed by a locating agent (e.g., locating agent 1415). In some implementations, one or more process blocks of FIG. 22 may be performed by another device or a group of devices separate from or including the locating agent.

As shown in FIG. 22, process 2200 may include identifying existing access points identifiable by a locating agent within the building, the existing access points operating according to a first communication protocol (block 2210). For example, the locating agent 1415 may identify existing access points 1704 identifiable by a locating agent within the building, the existing access points operating according to a first communication protocol, as described above.

As further shown in FIG. 22, process 2200 may include generating a no-connection list indicating when the locating agent cannot access the identifiable access points (block 2220). For example, the locating agent 1415 may generate a no-connection list 1573 indicating when the locating agent cannot access the identifiable access points, as described above.

As further shown in FIG. 22, process 2200 may include comparing a location of the locating agent to the no-connection list to identify a network void spot within the building (block 2230). For example, the locating agent 1415 may compare a location of the locating agent (e.g., current location 1554, or other known location such as determined by GPS or other locating sensor of the locating agent) to the no-connection list to identify a network void spot 1574 within the building, as described above.

As further shown in FIG. 22, process 2200 may include adding an infrastructure node corresponding to the network void spot, the infrastructure node having a second communication protocol different than the first communication protocol (block 2240). For example, the network void spot 1574 may be transmitted to an operator device (e.g., tablet, computer, smartphone etc.), and the IT operator of the building may add infrastructure node 1708 at the location of the network void spot 1574. At the locating agent, or other locating agents using the mesh network of the building, data regarding the added infrastructure node 1708 may be added to the known access points list 1511. The infrastructure node may include a second communication protocol different than the first communication protocol, as described above. Then, the locating agent or other locating agents may utilize the added infrastructure node for location thereof.

In a first implementation, the existing access points operate according to a first operator, and the infrastructure nodes operate according to a second operator different from the first operator. In embodiments, the second operator may be a dedicated network requiring registration thereto.

Process 2200 may include additional implementations, such as any single implementation or any combination of implementations described below and/or in connection with one or more other processes described elsewhere herein.

Although FIG. 22 shows example blocks of process 2200, in some implementations, process 2200 may include additional blocks, fewer blocks, different blocks, or differently arranged blocks than those depicted in FIG. 22. Additionally, or alternatively, two or more of the blocks of process 2200 may be performed in parallel.

Figure 23:
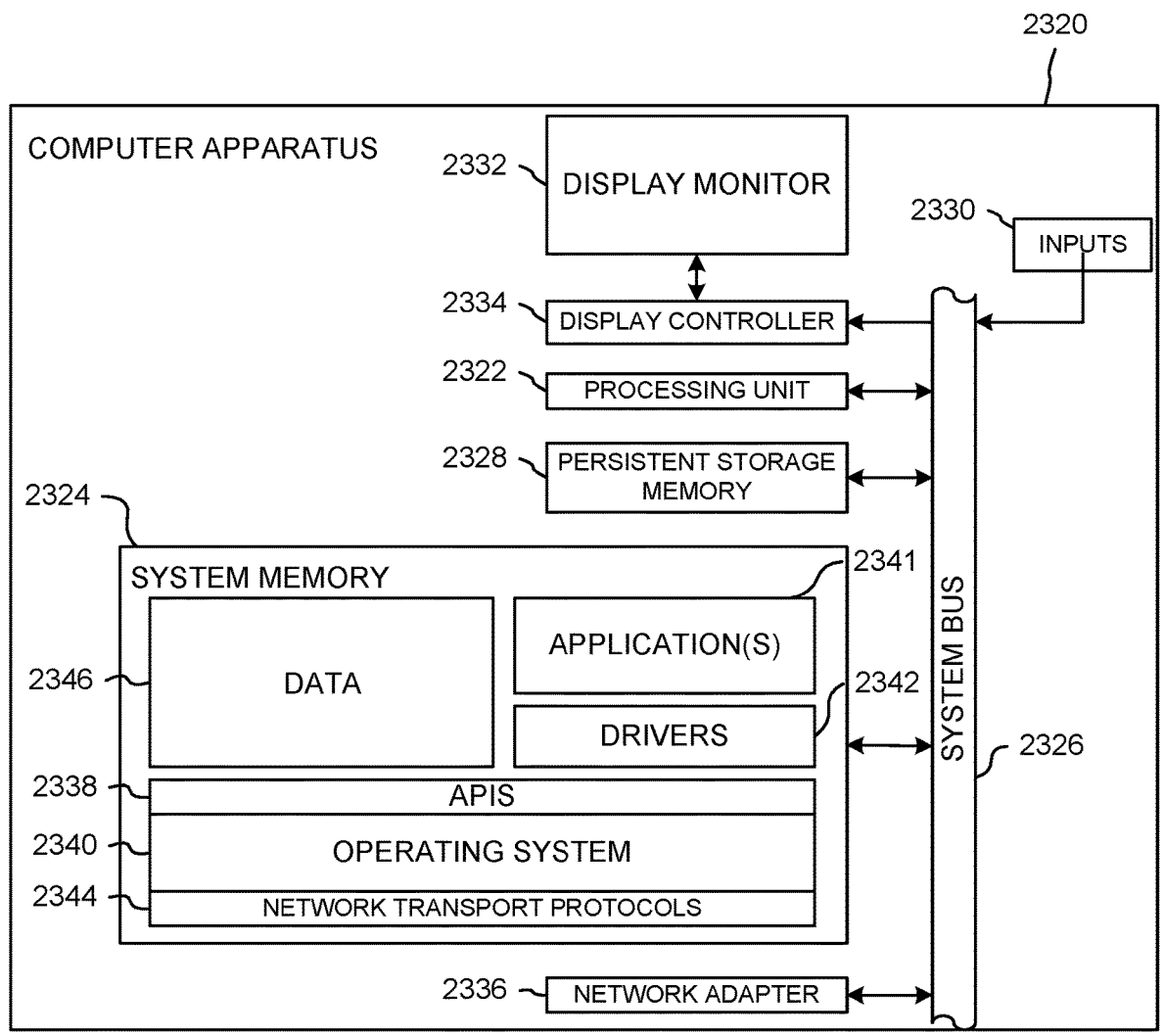
FIG. 23 shows an example embodiment of computer apparatus that, either alone or in combination with one or more other computing apparatus, is operable to implement one or more of the computer systems described in this specification.

FIG. 23 shows an example embodiment of computer apparatus 2320 that, either alone or in combination with one or more other computing apparatus, is operable to implement one or more of the computer systems described in this specification. For example, computer apparatus 2320 may represent any of locating agent 1415, calibrate node 1417, devices in system 700, or servers discussed herein. The computer apparatus 2320 includes a processing unit 2322, a system memory 2324, and a system bus 2326 that couples the processing unit 2322 to the various components of the computer apparatus 2320. The processing unit 2322 may include one or more data processors, each of which may be in the form of any one of various commercially available computer processors. The system memory 2324 includes one or more computer-readable media that typically are associated with a software application addressing space that defines the addresses that are available to software applications. The system memory 2324 may include a read only memory (ROM) that stores a basic input/output system (BIOS) that contains start-up routines for the computer apparatus 2320, and a random-access memory (RAM). The system bus 2326 may be a memory bus, a peripheral bus, or a local bus, and may be compatible with any of a variety of bus protocols, including PCI, VESA, Microchannel, ISA, and EISA. The computer apparatus 2320 also includes a persistent storage memory 2328 (e.g., a hard drive, a floppy drive, a CD ROM drive, magnetic tape drives, flash memory devices, and digital video disks) that is connected to the system bus 2326 and contains one or more computer-readable media disks that provide non-volatile or persistent storage for data, data structures and computer-executable instructions.

A user may interact (e.g., input commands or data) with the computer apparatus 2320 using one or more input devices 2330 (e.g. one or more keyboards, computer mice, microphones, cameras, joysticks, physical motion sensors, and touch pads). Information may be presented through a graphical user interface (GUI) that is presented to the user on a display monitor 2332, which is controlled by a display controller 2334. The computer apparatus 2320 also may include other input/output hardware (e.g., peripheral output devices, such as speakers and a printer). The computer apparatus 2320 connects to other network nodes through a network adapter 2336 (also referred to as a "network interface card" or NIC).

A number of program modules may be stored in the system memory 2324, including application programming interfaces 2338 (APIs), an operating system (OS) 2340 (e.g., the Windows® operating system available from Microsoft Corporation of Redmond, Washington U.S.A.), software applications 2341 including one or more software applications programming the computer apparatus 2320 to perform one or more of the steps, tasks, operations, or processes of the positioning and/or tracking systems described herein, drivers 2342 (e.g., a GUI driver), network transport protocols 2344, and data 2346 (e.g., input data, output data, program data, a registry, and configuration settings).

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method for identifying an access point for connection by a locating agent of a wireless tracking system, comprising:
   downloading a local portion of an access-point database from a server, the local portion corresponding to a general region that the locating agent is expected to be located in;
   storing the downloaded local portion on a memory of the locating agent;
   identifying, at the locating agent, one or more identifiable access points, each identifiable access point establishing a wireless network and being identifiable to the locating agent via a signal broadcast from the identifiable access point;
   comparing the identified one or more identifiable access points to the local portion of the access-point database defining known access points to the wireless tracking system;
   connecting to a first access point of the identified one or more identifiable access points based on the comparing; and
   transmitting one or more of sensed and monitoring data captured at the locating agent to an external device via the first access point.

2. The method of claim 1, the identifying comprising identifying a respective SSID broadcast by each identifiable access points.

3. The method of claim 1, the identifying including determining a received signal strength corresponding to each access point.

4. The method of claim 1, the comparing including identifying a connection access point list prioritizing at least some of the identifiable access points for selection as the first access point to connect with by the locating agent.

5. The method of claim 4, the local portion of the access-point database including an authorized access points list, a verified access points list, and an unusable access points list; the identifying a connection access point list including prioritizing each of the identifiable access points based on at least one of the authorized access points list, the verified access points list, and the unusable access points list.

6. The method of claim 1, the local portion of the access-point database defining white-listed access points that are defined as safe to connect with and black-listed access points that are not-to-be connected with.

7. The method of claim 4, the identifying a connection access point list including prioritizing each of the identifiable access points based on prior connection success with at least one other locating agents.

8. The method of claim 1, further comprising determining a location of the locating agent based on the identifiable access points; and receiving an update to the local portion of the access-point database when the location indicates the locating agent has crossed a pre-defined geofence.

9. The method of claim 1, further comprising:
   storing a connection history of the locating agent to at least one of the identifiable access points; and
   transmitting the connection history to another device.

10. The method of claim 1, further comprising:
    identifying one or more of the identifiable access points as an unknown access point without known connection information within the local portion of the access-point database;
    guessing connection information for the unknown access point; and
    transmitting the guessed connection information to another device when the connection information is successful in connecting the locating agent to a network associated with the unknown access point.

11. The method of claim 1, further comprising:
    communicating over a cellular network when connection to the first access point is unavailable;
    when communicating over the cellular network, implementing a connection governor; and when the first access point is a Wi-Fi access point and communicating via the first access point is available, reducing the connection governor.

12. A method for determining location of a locating agent of a wireless tracking system, comprising:
identifying, at the locating agent, one or more access points from one or more identifiable access points, each identifiable access point establishing a wireless network; and
comparing an access point characteristic of each of the identified one or more access points to known access point information to determine the location of the locating agent, wherein the known access point information is populated based on a planned itinerary for the locating agent.

13. The method of claim 12, further comprising, when the location indicates the locating agent has passed a geofence, transmitting an alert to an another device.

14. The method of claim 13, further comprising, after transmitting the alert to the another device, receiving an update to the known access point information, the update including additional known access points based on the geofence passed.

15. The method of claim 13, further comprising:
comparing the identified one or more access points to a known access point list corresponding to the planned itinerary; and
when the identified one or more access points do not correspond to the known access point list, transmitting an off-course alert.

16. The method of claim 15, wherein the identified one or more access points do not correspond to the known access point list when none of the identified one or more access points match an access point in the known access point list.

17. The method of claim 15, wherein the identified one or more access points do not correspond to the known access point list when less than a threshold number of known access points in the known access point list match a respective one of the identified one or more access points.

18. The method of claim 15, wherein transmitting an off-track alert includes activating a cellular communication device to transmit the off-course alert.

19. The method of claim 12, wherein the comparing an access point characteristic of each of the identified one or more access points to known access point information to determine the location of the locating agent occurs without connecting to a network established by one of the identified one or more access points.

20. A method for configuring a mesh network within a building, comprising:
identifying existing access points identifiable by a locating agent within the building, the existing access points operating according to a first communication protocol;
generating a no-connection list indicating when the locating agent cannot access the identified existing access points;
comparing a location of the locating agent to the no-connection list to identify a network void spot within the building; and
after the comparing, updating an access point list with information regarding an infrastructure node corresponding to the network void spot, the infrastructure node having a second communication protocol different than the first communication protocol.

21. The method of claim 20, the adding including updating the infrastructure node in a known access point list.

22. The method of claim 21, further comprising, utilizing the infrastructure node to locate the locating agent.

23. The method of claim 20, wherein the existing access points operate according to a first service, and the infrastructure node operates according to a second service different from the first service.

24. The method of claim 23, the second service being a dedicated network requiring registration thereto.

* * * * *